US008410948B2

(12) United States Patent
Vander Horst

(10) Patent No.: US 8,410,948 B2
(45) Date of Patent: Apr. 2, 2013

(54) RECREATIONAL VEHICLE HOLDING TANK SENSOR PROBE

(75) Inventor: John Vander Horst, Littleton, CO (US)

(73) Assignee: John Vander Horst, Littleton, CO (US)

( * ) Notice: Subject to any disclaimer, the term of this patent is extended or adjusted under 35 U.S.C. 154(b) by 1353 days.

(21) Appl. No.: 12/119,427

(22) Filed: May 12, 2008

(65) Prior Publication Data
US 2009/0278699 A1 Nov. 12, 2009

(51) Int. Cl.
*G08B 21/00* (2006.01)
(52) U.S. Cl. ........ 340/620; 340/531; 340/352; 340/603; 340/612; 340/616; 340/618; 340/622; 340/623; 340/627
(58) Field of Classification Search .................. 340/531, 340/532, 603, 612, 616, 618, 620, 622, 623, 340/627
See application file for complete search history.

(56) References Cited

U.S. PATENT DOCUMENTS

| | | | | |
|---|---|---|---|---|
| 2,701,919 A * | 2/1955 | Anderson | ......................... | 33/717 |
| 2,748,379 A * | 5/1956 | Rowland | ....................... | 340/614 |
| 2,910,940 A * | 11/1959 | Colman et al. | .................. | 92/5 R |
| 2,924,756 A * | 2/1960 | Tolin | ............................... | 361/178 |
| 2,928,037 A * | 3/1960 | Lawrence | ..................... | 307/117 |
| 2,968,753 A * | 1/1961 | Mesh | ............................. | 318/675 |
| 3,018,322 A * | 1/1962 | Goellner | ....................... | 174/151 |
| 3,119,266 A * | 1/1964 | Atkinson | ..................... | 73/304 R |
| 3,145,567 A * | 8/1964 | Bobrowsky | ....................... | 73/295 |
| 3,166,485 A * | 1/1965 | Lloyd | ......................... | 205/780.5 |
| 3,200,645 A * | 8/1965 | Levins | ............................ | 73/313 |
| 3,254,333 A * | 5/1966 | Baumoel | ...................... | 73/304 C |
| 3,306,109 A * | 2/1967 | Caparone | ....................... | 428/616 |
| 3,363,466 A * | 1/1968 | Guidi | ............................... | 73/295 |
| 3,474,337 A * | 10/1969 | Petrick | .......................... | 324/644 |
| 3,653,017 A * | 3/1972 | Parkes | ........................... | 340/620 |
| 3,671,912 A * | 6/1972 | La Sota | ........................... | 338/34 |
| 3,748,551 A * | 7/1973 | Petersen | ....................... | 361/284 |
| 3,766,395 A * | 10/1973 | Keir | .......................... | 250/214 R |

(Continued)

FOREIGN PATENT DOCUMENTS
JP 63002621 A * 1/1988

OTHER PUBLICATIONS

KIB Enterprises-Monitor Panels: web page downloaded from the Internet on May 9, 2008 at www.kibenterprises.com/monitorpanels-mm.html.

(Continued)

*Primary Examiner* — George Bugg
*Assistant Examiner* — Paul Obiniyi
(74) *Attorney, Agent, or Firm* — Kilpatrick Townsend & Stockton LLP

(57) ABSTRACT

A wastewater holding tank sensor probe for use in determining the presence of a conductive liquid held within a wastewater holding tank in a recreational vehicle is disclosed. The probe is less sensitive to the presence of conductive residue as a result of an improved geometry and/or choice of materials that reduce the leakage currents between the probe tip and the sensor probe attachment surface, typically the wall of the tank. This reduction in sensitivity to conductive residue buildup can be measured by a geometrically determined resistivity factor between the probe tip and the mounting surface of the probe. The reduction in sensitivity can also be measured by the length of the path through the conductive residue between the probe tip and the mounting surface of the probe. A variety of geometries and material choices to reduce the sensitivity of electrical conductance based sensor probes to conductive residue are disclosed.

25 Claims, 13 Drawing Sheets

U.S. PATENT DOCUMENTS

| | | | |
|---|---|---|---|
| 3,774,238 A * | 11/1973 | Hardway, Jr. | 324/663 |
| 3,864,974 A * | 2/1975 | Rauchwerger | 73/304 C |
| 3,874,223 A * | 4/1975 | Miyazaki et al. | 73/32 R |
| 3,901,079 A * | 8/1975 | Vogel | 73/304 C |
| 3,910,118 A * | 10/1975 | Schittek et al. | 73/304 R |
| 3,936,737 A * | 2/1976 | Jefferies, Sr. | 324/700 |
| 3,956,760 A * | 5/1976 | Edwards | 340/620 |
| 3,964,037 A * | 6/1976 | Lamphere | 340/521 |
| 3,984,877 A * | 10/1976 | Kirby | 4/314 |
| 4,002,552 A * | 1/1977 | Bunn et al. | 204/228.2 |
| 4,021,707 A * | 5/1977 | Ehret et al. | 361/284 |
| 4,027,172 A * | 5/1977 | Hamelink | 307/118 |
| 4,035,823 A * | 7/1977 | Marshall | 257/419 |
| 4,038,871 A * | 8/1977 | Edwards | 73/304 C |
| 4,056,887 A * | 11/1977 | Tucker et al. | 33/715 |
| 4,090,408 A * | 5/1978 | Hedrick | 73/304 C |
| 4,167,874 A * | 9/1979 | Grant | 73/290 R |
| 4,173,893 A * | 11/1979 | Hedrick | 73/304 C |
| 4,196,384 A * | 4/1980 | Willenbrock et al. | 324/446 |
| 4,196,624 A * | 4/1980 | Willenbrock et al. | 73/304 R |
| 4,223,969 A * | 9/1980 | Gatturna | 439/194 |
| 4,224,949 A * | 9/1980 | Scott et al. | 600/373 |
| 4,284,210 A * | 8/1981 | Horak | 222/14 |
| 4,316,174 A * | 2/1982 | Sutton et al. | 340/438 |
| 4,329,550 A * | 5/1982 | Verley | 200/84 C |
| 4,389,889 A * | 6/1983 | Larson | 73/304 C |
| 4,390,793 A * | 6/1983 | John | 307/118 |
| 4,481,467 A * | 11/1984 | Alexandersen et al. | 324/72.5 |
| 4,499,640 A * | 2/1985 | Brenton et al. | 29/25.41 |
| 4,499,641 A * | 2/1985 | Fleckenstein | 29/25.41 |
| 4,499,767 A * | 2/1985 | Fathauer et al. | 73/304 C |
| 4,503,383 A * | 3/1985 | Agar et al. | 324/663 |
| 4,507,521 A * | 3/1985 | Goellner | 174/151 |
| 4,515,015 A * | 5/1985 | Kuhlman | 73/304 C |
| 4,549,245 A * | 10/1985 | Fleckenstein | 361/284 |
| 4,594,892 A * | 6/1986 | Asmundsson | 73/304 C |
| 4,595,341 A * | 6/1986 | Castell-Evans | 417/1 |
| 4,601,201 A * | 7/1986 | Oota et al. | 73/304 C |
| 4,631,375 A * | 12/1986 | McCann | 200/84 C |
| 4,638,305 A * | 1/1987 | Sutton | 340/620 |
| 4,660,026 A * | 4/1987 | Chandler | 340/604 |
| 4,694,128 A * | 9/1987 | Lupoli et al. | 200/84 R |
| 4,736,193 A * | 4/1988 | Slocum et al. | 340/522 |
| 4,739,658 A * | 4/1988 | Slavik | 73/313 |
| 4,758,700 A * | 7/1988 | Lupoli et al. | 200/275 |
| 4,797,614 A * | 1/1989 | Nelson | 324/236 |
| 4,806,847 A * | 2/1989 | Atherton et al. | 73/304 C |
| 4,811,160 A * | 3/1989 | Fleckenstein | 361/284 |
| 4,831,360 A * | 5/1989 | Clarkson et al. | 340/521 |
| 4,835,521 A * | 5/1989 | Andrejasich et al. | 340/521 |
| 4,835,522 A * | 5/1989 | Andrejasich et al. | 340/521 |
| 4,855,714 A * | 8/1989 | Clarkson et al. | 340/521 |
| 4,879,902 A * | 11/1989 | Loniello | 73/304 R |
| 4,885,533 A * | 12/1989 | Coe | 324/755.05 |
| 4,888,989 A * | 12/1989 | Homer | 73/304 C |
| 4,903,530 A * | 2/1990 | Hull | 73/304 R |
| 4,905,743 A * | 3/1990 | Gray | 141/198 |
| 4,988,975 A * | 1/1991 | Nap | 340/450.3 |
| 4,991,915 A * | 2/1991 | Thompson et al. | 324/640 |
| 5,001,927 A * | 3/1991 | LaCava et al. | 73/304 C |
| 5,005,407 A * | 4/1991 | Koon | 73/290 R |
| 5,008,653 A * | 4/1991 | Kidd et al. | 340/620 |
| 5,041,856 A * | 8/1991 | Veronesi et al. | 324/204 |
| 5,056,363 A * | 10/1991 | Arekapudi et al. | 73/292 |
| 5,057,813 A * | 10/1991 | Sasaki et al. | 340/450.3 |
| 5,059,954 A * | 10/1991 | Beldham et al. | 340/614 |
| 5,079,950 A * | 1/1992 | McKiernan et al. | 73/313 |
| 5,150,102 A * | 9/1992 | Takashima | 340/584 |
| 5,156,047 A * | 10/1992 | Tuma et al. | 73/304 C |
| 5,178,009 A * | 1/1993 | Arekapudi et al. | 73/292 |
| 5,253,521 A * | 10/1993 | Abramovich et al. | 73/306 |
| 5,279,157 A * | 1/1994 | Mattis et al. | 73/290 R |
| 5,283,552 A * | 2/1994 | Sol | 340/605 |
| 5,333,498 A * | 8/1994 | Brackett et al. | 73/304 R |
| 5,391,995 A * | 2/1995 | Johnston et al. | 324/755.05 |
| 5,438,323 A * | 8/1995 | Shea | 340/620 |
| 5,442,224 A * | 8/1995 | Yoshimizu et al. | 257/536 |
| 5,487,300 A * | 1/1996 | Brackett et al. | 73/61.59 |
| 5,546,005 A * | 8/1996 | Rauchwerger | 324/688 |
| 5,582,798 A * | 12/1996 | Meltzer | 422/518 |
| 5,589,823 A * | 12/1996 | Lange | 340/622 |
| 5,600,997 A * | 2/1997 | Kemp et al. | 73/290 V |
| 5,602,540 A * | 2/1997 | Spillman, Jr. | 340/870.37 |
| 5,654,207 A * | 8/1997 | Fukuyama et al. | 204/192.17 |
| 5,719,556 A * | 2/1998 | Albin et al. | 340/618 |
| 5,727,421 A * | 3/1998 | Murphy | 73/304 R |
| 5,834,657 A * | 11/1998 | Clawson et al. | 73/863.81 |
| 5,923,102 A * | 7/1999 | Koenig et al. | 307/118 |
| 5,929,763 A * | 7/1999 | Koski | 340/618 |
| 5,942,980 A * | 8/1999 | Hoben et al. | 340/618 |
| 5,954,646 A * | 9/1999 | Jost et al. | 600/406 |
| 6,049,088 A * | 4/2000 | Harding | 250/577 |
| 6,217,752 B1 * | 4/2001 | Coots | 210/86 |
| 6,323,659 B1 * | 11/2001 | Krahn | 324/554 |
| 6,396,293 B1 * | 5/2002 | Vinther et al. | 324/755.05 |
| 6,413,475 B2 * | 7/2002 | Ishizawa et al. | 422/106 |
| 6,423,213 B1 * | 7/2002 | Mazurek | 210/115 |
| 6,429,447 B1 * | 8/2002 | Nowak et al. | 250/573 |
| 6,462,567 B1 * | 10/2002 | Vinther et al. | 324/754.14 |
| 6,481,276 B1 * | 11/2002 | Neuhaus et al. | 73/304 C |
| 6,539,286 B1 * | 3/2003 | Jiang | 700/282 |
| 6,548,775 B1 * | 4/2003 | Edwards | 200/81.9 M |
| 6,600,330 B1 * | 7/2003 | Nightingale et al. | 324/755.01 |
| 6,624,755 B1 * | 9/2003 | Chamberlin | 340/620 |
| 6,662,649 B1 * | 12/2003 | Knight et al. | 73/290 V |
| 6,776,900 B2 * | 8/2004 | Mazurek et al. | 210/115 |
| 6,819,120 B2 * | 11/2004 | Tam | 324/633 |
| 6,860,162 B1 * | 3/2005 | Jaeger | 73/863.85 |
| 6,904,800 B2 * | 6/2005 | Merwin | 73/304 R |
| 6,917,088 B2 * | 7/2005 | Takahashi et al. | 257/422 |
| 6,930,609 B1 * | 8/2005 | Florenz et al. | 340/612 |
| 6,978,765 B2 * | 12/2005 | Kilgore | 123/456 |
| 6,998,990 B2 * | 2/2006 | Johnson | 340/620 |
| 7,036,224 B2 * | 5/2006 | Gul | 29/857 |
| 7,095,330 B2 * | 8/2006 | Meeks et al. | 340/620 |
| 7,145,465 B2 * | 12/2006 | Chamberlin | 340/620 |
| 7,249,507 B2 * | 7/2007 | Weedon | 73/304 R |
| 7,284,428 B1 * | 10/2007 | Hoben et al. | 340/612 |
| 7,711,509 B2 * | 5/2010 | Woodard et al. | 702/100 |
| 7,940,165 B1 * | 5/2011 | Oxley et al. | 340/450.2 |
| 7,963,164 B2 * | 6/2011 | Ross et al. | 73/304 C |
| 7,992,437 B2 * | 8/2011 | Tshishiku | 73/431 |
| 8,180,489 B2 * | 5/2012 | Quinn et al. | 700/266 |
| 8,232,552 B2 * | 7/2012 | Yano et al. | 257/43 |
| 2002/0175822 A1 * | 11/2002 | Merwin | 340/620 |
| 2003/0020494 A1 * | 1/2003 | Desmier et al. | 324/667 |
| 2003/0132744 A1 * | 7/2003 | Nightingale et al. | 324/158.1 |
| 2003/0210140 A1 * | 11/2003 | Menard et al. | 340/531 |
| 2004/0001004 A1 * | 1/2004 | Chamberlin et al. | 340/623 |
| 2004/0004545 A1 * | 1/2004 | Early | 340/539.26 |
| 2004/0004550 A1 * | 1/2004 | Early | 340/603 |
| 2004/0004551 A1 * | 1/2004 | Early | 340/603 |
| 2004/0027137 A1 * | 2/2004 | Sherrard | 324/644 |
| 2004/0093942 A1 * | 5/2004 | Brun | 73/301 |
| 2004/0093943 A1 * | 5/2004 | Arias | 73/304 C |
| 2004/0100277 A1 * | 5/2004 | Tam | 324/633 |
| 2004/0123659 A1 * | 7/2004 | Merwin | 73/304 R |
| 2004/0138818 A1 * | 7/2004 | Shray et al. | 702/6 |
| 2004/0189478 A1 * | 9/2004 | Chamberlin | 340/618 |
| 2004/0227636 A1 * | 11/2004 | Gul | 340/620 |
| 2004/0246014 A1 * | 12/2004 | Goto | 324/761 |
| 2005/0062611 A1 * | 3/2005 | Johnson | 340/616 |
| 2005/0088309 A1 * | 4/2005 | Meeks et al. | 340/620 |
| 2005/0109682 A1 * | 5/2005 | Mazurek et al. | 210/86 |
| 2005/0235963 A1 * | 10/2005 | Kilgore | 123/456 |
| 2005/0236307 A1 * | 10/2005 | Mazurek et al. | 210/86 |
| 2006/0021431 A1 * | 2/2006 | Immel | 73/304 C |
| 2006/0053880 A1 * | 3/2006 | Taylor et al. | 73/304 C |
| 2006/0084866 A1 * | 4/2006 | Lewkonya et al. | 600/433 |
| 2006/0156809 A1 * | 7/2006 | Immel | 73/304 R |
| 2006/0208915 A1 * | 9/2006 | Oakner et al. | 340/620 |
| 2006/0230827 A1 * | 10/2006 | Klees et al. | 73/304 R |
| 2006/0238213 A1 * | 10/2006 | Goto | 324/761 |
| 2006/0273812 A1 * | 12/2006 | Goto | 324/761 |
| 2007/0047172 A1 * | 3/2007 | Wilbertz et al. | 361/272 |
| 2007/0193342 A1 * | 8/2007 | Bailey et al. | 73/53.01 |
| 2007/0234796 A1 * | 10/2007 | Tshishiku | 73/290 R |

| | | | | |
|---|---|---|---|---|
| 2008/0174442 | A1* | 7/2008 | Minott et al. | 340/627 |
| 2008/0281528 | A1* | 11/2008 | Relle, Jr. | 702/19 |
| 2008/0302660 | A1* | 12/2008 | Kahn et al. | 204/416 |
| 2009/0199634 | A1* | 8/2009 | Tonner | 73/295 |
| 2009/0256700 | A1* | 10/2009 | Reid et al. | 340/539.1 |
| 2011/0175729 | A1* | 7/2011 | Kessinger | 340/540 |

OTHER PUBLICATIONS

Author Unknown, "Aquagauge," Products, Electrosense Technologies, Mar. 13, 2009, 4 pages. Retrieved from: http://www.electrosense.com.au/products.htm.

Author Unknown, "Aquagauge," Software Info, Electrosense Technologies, Jul. 31, 2008, 3 pages. Retrieved from: http://www.electrosense.com.au/Software%20Info.htm.

Author Unknown. "Capacitive Sensors (KAS)," Rechner Sensors, Date Unknown, 1 page. Retrieved from: http://www.rechner.de/en/prod/kap_s/kas/.

Author Unknown, "Menu of Displacement Transducers," RDP Group, May 2, 2012, 4 pages. Retrieved from: http://www.rdpe.com/us/men-disp.htm.

Author Unknown, "Monitoring Systems," Electrosense, Date unknown, 4 pages. Retrieved from: http://www.electrosense.com/index.html.

Author Unknown, "Products," Snake River Electronics, 2009, 5 pages.

Author Unknown, "RV Application Products," SeeLevel Gauges, 2Garnet Instruments Ltd., 2005, 1 page. Retrieved from: http://www.rvgauge.com/rv.htm.

Author Unknown, "SenseTank RV 100 Featured on Fleetwood's Revolutionary Heritage 'Victory Circle' Coach," Business Services Industry, Business Wire, Oct. 8, 2003, 2 pages. Retrieved from http://findarticles.com/p/articles/mi_m0EIN/is_2003_Oct_8/ai_108626753/.

Author Unknown, "Tank Monitor Systems," JRV Products Inc., Date Unknown, 2 pages. Retrieved from: http://www.jrvproductsinc.com/tank.html.

Author Unknown, "Tank Monitor," Our Products, Raritan Engineering Company, Inc., Jan. 13, 2011, 2 pages. Retrieved from: http://www.raritaneng.com/products/accessories/tank_monitor.html.

Author Unknown, "TankWatch 1 Holding Tank Alert System," Dometic Sanitation Corporation, Date Unknown, 3 pages.

Author Unknown, "TankWatch 4 Holding Tank Level Indicator System," Dometic Sanitation Corporation, Date Unknown, 10 pages.

Pardus, G., "SenseTank RV 100 Featured on New Fleetwood American Coach Lines," Material Sciences Corporation, Jun. 3, 2004, 1 page. Retrieved from: http://phx.corporate-ir.net/phoenix.zhtml?c=118547&p=irol-newsArticle&ID=578476&highlight=.

* cited by examiner

US 8,410,948 B2

RECREATIONAL VEHICLE HOLDING TANK SENSOR PROBE

BACKGROUND

This disclosure relates to the measurement of the level of a conductive liquid in a recreational vehicle wastewater holding tank.

Many recreational vehicles, such as campers, trailers, fifth wheelers, and motor homes, have one or more tanks for storing the effluent or wastewater originating in the toilet, sink, or shower. These tanks are also called black water or gray water tanks. The wastewater in these tanks is electrically conductive. Measuring the existence of a conductive path between sensor probes mounted at various levels in a recreational vehicle holding tank is a simple and cost-effective way to determine the level of fluid in the tank. The principle is that there should only be conductance between pairs of probe tips that are submerged in the wastewater.

False conductance readings caused by leakage currents from probe tips not submerged in the wastewater are a problem with systems that use conductance to measure liquid level. These leakage currents travel through the conductive residue that can build up on every surface of the tank that is exposed to the effluent, typically traveling from the non-submerged probe tip to the wall of the tank where the sensor probe is installed and then along the wall until they reach the conductive liquid. These leakage currents cause the liquid level measuring circuit to show that the tank has more wastewater in it than it actually does. Thus, the recreational vehicle owner either drains the wastewater holding tanks too frequently or ignores the readings from the level measuring circuit and runs the risk of a tank overflow. The same problem can occur in any moving wastewater tank, including but not limited to mobile environments such as boats, trains, buses, aircraft, or transportable lavatories.

SUMMARY

In one embodiment, the present disclosure provides a wastewater holding tank sensor probe for use in determining the presence of a conductive liquid held within a wastewater holding tank in a recreational vehicle. The probe is less sensitive to the presence of conductive residue as a result of an improved geometry and/or choice of materials that reduce the leakage currents between the probe tip and the surface that sensor probe has been installed into, typically the wall of the tank. This reduction in sensitivity to conductive residue buildup can be measured by a geometrically determined resistivity factor between the probe tip and the mounting surface of the probe as defined herein. The reduction in sensitivity can also be measured by the length of the path through the conductive residue between the probe tip and the mounting surface of the probe. A variety of geometries and material choices to reduce the sensitivity of electrical conductance based sensor probes to conductive residue are disclosed.

BRIEF DESCRIPTION OF THE DRAWINGS

The present disclosure is described in conjunction with the appended figures in which.

Figure 1:
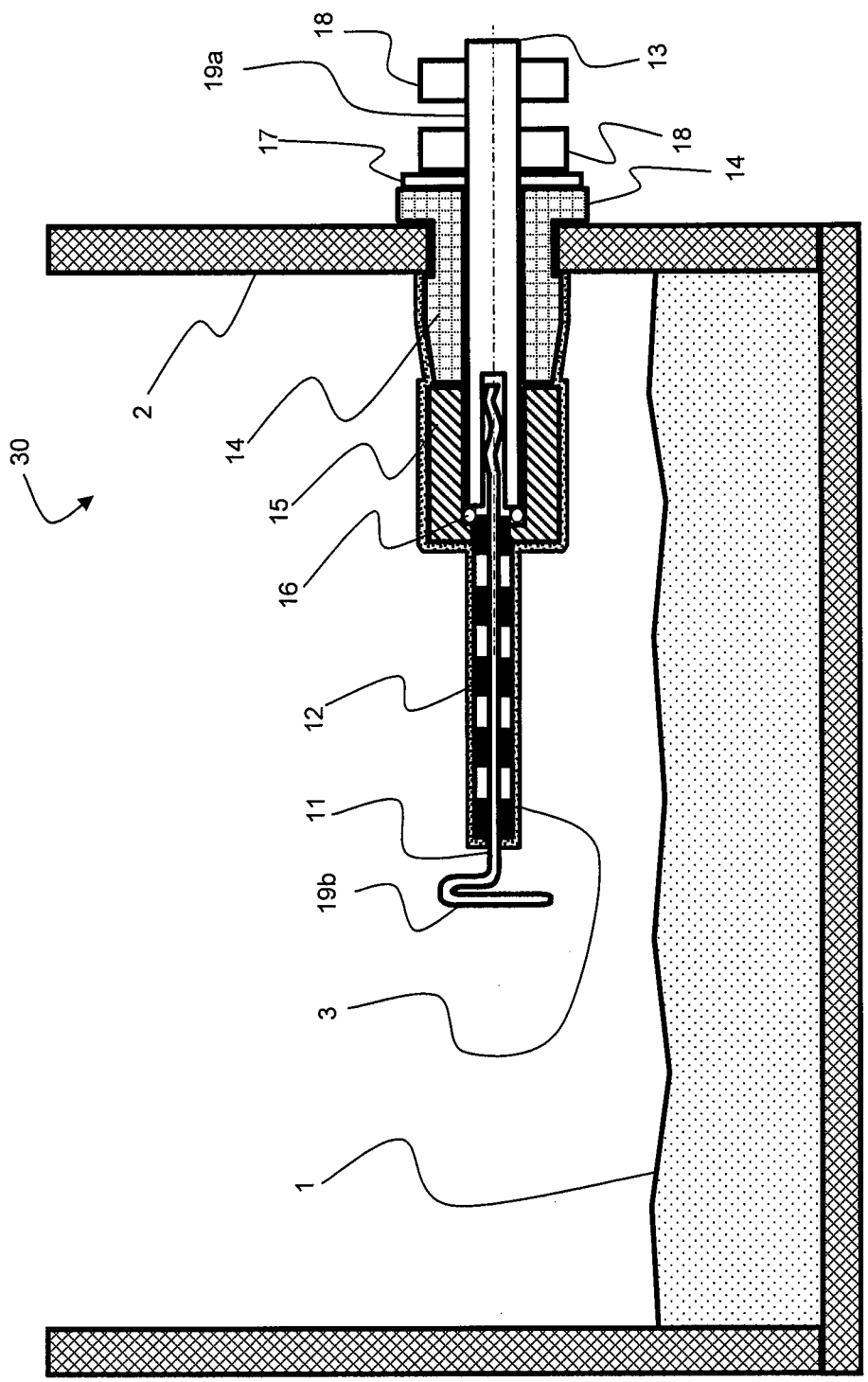
FIG. 1 depicts a sensor probe mounted in a wastewater holding tank of a recreational vehicle.

In the appended figures, similar components and/or features may have the same reference label. Where the reference label is used in the specification, the description is applicable to any one of the similar components having the same reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It should be understood that various changes could be made in the function and arrangement of elements without departing from the spirit and scope as set forth in the appended claims.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

In one embodiment, the present disclosure provides a sensor probe suitable for use in a wastewater holding tank of a recreational vehicle. Wastewater holding tanks are typically located downstream of a toilet, sink, shower, or any other place where water is used to clean something or where water is combined with other fluids or solids. In addition to recreational vehicles, moving wastewater holding tanks can be used in other transportable or moving applications such as boats, trains, buses, aircraft, or portable lavatories. The probe includes an electrical contact configured for wiring into a level measuring circuit, a probe tip configured for contact with fluid within the tank during normal operation; an electrical conductor that connects the probe tip with the electrical contact, and an electrical insulator that encapsulates at least part of the conductor. Probes of the type described in this disclosure can also be used in tanks that contain conductive fluids other than water. Probes of the type described in this disclosure can also be used in tanks that are not holding waste, such a bioreactors.

The present disclosure makes reference to one or more geometric configurations that increase the resistivity factor of the conductive residue path between a probe tip and the wall of a tank. For purposes of this disclosure, resistivity factor is defined as the ratio of the length of a conductive residue path divided by the width of that path. Since, in most cases the width of the conductance path is also a perimeter, we shall normally define this resistivity factor as length divided by perimeter. If the conductive residue path is circular in cross section, it can also be defined as the length divided by the circumference. The one objective of the present disclosure is to increase the electrical resistance between the probe tip and the attachment surface in the tank, typically the tank wall. For a material with uniform bulk resistance, the resistance of an electrical conductor can be calculated from the following formula:

$$\Omega = \rho L / A$$

Where:
- $\Omega$=the resistance of the electrical conductor in ohms;
- $\rho$=the bulk resistance measured in ohm inches (or ohm centimeters or ohm meters);
- L=the length of the conductor measured in inches, centimeters, or meters; and
- A=the cross-sectional area of the conductor measured in square inches, square centimeters or square meters.

Often the cross sectional area (A) of the conductive residue path consists of a coating of an undetermined thickness (t) multiplied by the perimeter P. Thus the above equation can be rewritten as:

$$\Omega = \rho L/(tP) = (\rho/t)(L/P)$$

Where $\rho$ and t are determined by the bulk resistance and thickness of the conductive residue film and L and P are determined by the geometry of the probe. For a geometrical configuration with a constant perimeter along the entire length, we can define the resistivity factor ($R_F$) to be:

$$R_F = L/P$$

For a geometrical configuration composed of discrete elements of varying size, we can define the resistivity factor ($R_F$) to be:

$$R_F = \sum_{i=1}^{n} \frac{L_i}{P_i}$$

For a geometrical configuration with a constantly varying perimeter (P) as a function of distance along a conductance path, we can define the resistivity factor ($R_F$) to be:

$$R_F = \int_{L_T}^{L_W} \frac{\delta L}{P}$$

Where:
- $L_T$=the probe tip; and
- $L_W$=the tank wall

The use of a resistivity factor will become clearer as we review various embodiments.

Referring to FIG. 1, an embodiment of a sensor probe mounted in a wastewater holding tank of a recreational vehicle is shown at 30. The holding tank wall is shown at 2. The tank is filled with conductive liquid shown at 1. The probe 30 is mounted through an aperture in the wall of the tank 2. If a sensor probe is mounted to the wall of a tank in a recreational vehicle the mounting aperture is typically a ⅜-inch circular hole, but can be any other size or shape capable of being manufactured and capable of being understood by anyone skilled in the art. The probe is shown mounted in a side wall. It is also possible for the probe to be mounted on a bottom wall or top wall of the tank or any other mounting surfaces including a fixture that is attached to the tank in some way. Wastewater holding tank walls are typically made of either ABS (acrylonitrile butadiene styrene) or polyethylene, but can be made of any material that can service this function, is manufacturable, and is capable of being understood by someone skilled in the art. The tank wall does not necessarily need to be made of a non-conductive material.

Also referring to FIG. 1, an electrical contact is shown at 19a. The electrical contact 19a is intended to be located external to the tank when the probe 30 is installed in the tank wall 2. The electrical contact 19a allows the probe 30 to be connected to a level measuring circuit that measures current, voltage, or resistance between multiple probes or between one probe and some other electrical reference point using electrical circuits capable of being understood by anyone skilled in the art. The electrical contact 19a can be made of any electrically conductive material capable of being understood by anyone skilled in the art.

Also referring to FIG. 1, a probe tip is shown at 19b. The probe tip 19b is intended to be located within the tank and to make electrical contact with the liquid 1 when the liquid reaches a predetermined level. The probe tip 19b can be any shape or size and can be made of any material that conducts electricity. Among the materials that can be used for probe tips 19b are stainless steel, copper, silver, aluminum, gold, conductive ceramic, and any other electrically conductive material capable of being understood by someone skilled in the art. There is an electrical conductor between the probe tip 19b and the electrical contact 19a that electrically couples the probe tip 19b and electrical contact 19a. In the embodiment illustrated in FIG. 1, the electrical conductor is made up of an electrically conductive wire, shown at 11 and an electrically conductive threaded rod shown at 13. In the embodiment shown in FIG. 1, the probe tip 19b and the wire 11 are monolithic (constituting a massive undifferentiated whole) and the threaded rod 13 and electrical contact 19a are also monolithic. The wire 11 and threaded rod 13 are electrically coupled at the point where they touch, which is accomplished in the embodiment shown in FIG. 1 by deforming the wire 11 to be in a zigzag shape and pressing that into a cylindrical hole in the threaded rod 13. With the present invention, it is possible for the probe tip 19b, the electrical conductor (comprising 11 and 13 in FIG. 1), and electrical contact 19a to be any combination of any number of distinct or monolithic elements that are electrically coupled to one another using any techniques capable of being understood by someone skilled in the art.

Also referring to FIG. 1, an insulating tube is shown at 12, a threaded cap is shown at 15, and a fitting is shown at 14. The insulating tube 12, threaded cap 15, and fitting 14 are made of electrically insulating materials. In one embodiment, the insulating tube 12 is made of polytetrafluoroethylene and the threaded cap 15 is made of acetal. In this embodiment, the insulating tube 12 fits over the electrically conductive wire 11. Together, the insulating tube 12, threaded cap 15, and fitting 14 determine the length of the path from the probe tip 19b to the holding tank wall 2. Conductive residue can coat the insulating tube 12, threaded cap 15, and fitting 14 creating a conductive residue path, shown at 3 from the probe tip 19b to the attachment surface of the probe, which in this case is the holding tank wall 2. One objective of the present invention is to make the conductive residue path 3 as long as possible, thereby increasing the total electrical resistance of the conductive residue path 3. Leakage currents through the conductive residue path 3 to the holding tank wall 2 and then along the conductive residue on the holding tank wall 2 until it touches the conductive liquid 1 can create false readings from sensor probes not submerged in the wastewater. These leakage currents are a problem with systems that use conductance to measure liquid level. In the embodiment shown in FIG. 1, the length of the conductive residue path 3 along the fitting 14 is approximately ⅜ inch, the length of the conductive residue path 3 along the threaded cap 15 is approximately ⅜ inch, and the length of the conductive residue path 3 along the insulating tube 12 is approximately ¾ inches giving a total length of the path from the probe tip along the exposed surface of the electrical insulators (insulating tube 12, threaded cap 15, and fitting 14) to the wall of the wastewater holding tank 2 of approximately 1½ inches. It is possible for this total path length to be greater than ¾ inches, greater than 1 inch, greater than 1¼ inches, greater than 1½ inches greater than 1¾ inches greater than 2 inches, greater than 2¼ inches, greater than 2½ inches, greater than 2¾ inches, and greater than 3 inches.

Also referring to FIG. 1, Ohms Law teaches us that the amount of leakage current through the conductive residue path 3 is inversely proportional to the resistance of the conductive residue path 3. The resistance of the conductive residue path 3 can be calculated as the sum of the resistances of individual slices of this conductive residue path 3 that are taken perpendicular to the current flow through the conductive residue path 3. By minimizing the perimeter of each of these slices of the conductive residue path 3, we can further increase the overall resistance of the residue conductive path 3, thereby reducing the sensitivity of the probe 30 to false readings caused by conductive residue. In the embodiment shown in FIG. 1, the maximum diameter of the conductive residue path is approximately ⅜ of an inch, giving a perimeter of the conductive residue path of approximately 1.2 inches (pi×0.375 inches) over the ¾ inch length of the fitting 14 and the threaded cap 15. One can calculate a resistivity factor, as previously defined, for this part of the conductance path of 0.75 inches divided by 1.2 inches or approximately 0.6. For the insulating tube, the outside diameter is approximately 0.05 inches and the length is approximately 0.75 inches giving a resistivity factor of 0.75/(0.05×3.14)=4.8. This gives a resistivity factor for this configuration of approximately 5.4. It is possible for the resistivity factor for this embodiment to be greater than 0.5, greater than 0.75, greater than 1.0, greater than 1.25, greater than 1.5, greater than 1.75, greater than 2.0, greater than 2.5, greater than 3.0, greater than 3.5, greater than 4.0, greater than 4.5, greater than 5.0, greater than 5.5, or greater than 6.0.

Also referring to the insulating tube 12 in FIG. 1, the above calculation of the resistivity factor, having a section of an electrical insulator, such as the insulating tube 12, that has a narrow outside diameter makes a very large difference in the resistivity factor and hence the overall capability of the conductive residue path 3 to conduct electricity. A typical outside diameter of the insulating tube 12 is 0.05 inches. This outside diameter can be less than 1/16 inch, it can be less than 3/32 inch, it can be less than ⅛ inch, it can be less than 5/32 inch, it can be less than 3/16 inch, it can be less than 7/32 inch, it can be less than ¼ inch, it can be less than 9/32 inch, it can be less than 5/16 inch, it can be less than 11/32 inch, or it can be less than ⅜ inch. The resulting perimeter can be less than 0.2 inches, it can be less than 0.3 inches, it can be less than 0.4 inches, it can be less than 0.5 inches, it can be less than 0.6 inches, it can be less than 0.7 inches, it can be less than 0.8 inches, it can be less than 0.9 inches, or it can be less than 1 inch. The length of this narrow section of insulating tube 12 in the direction of current flow through the conductive residue path 3 can be a minimum of ⅛ inch, ¼ inch, ⅜ inch, ½ inch, ⅝ inch, or ¾ inch.

Also referring to the conductive residue path 3 in FIG. 1, the thickness of the residue can be influenced by the properties of the insulating tube 12, the fitting 14, and the threaded cap 15. In particular, the use of a material or surface with non-wetting properties on one or more elements of the of the conductive residue path 3, such as the insulating tube 12, the fitting 14, or the threaded cap 15 can further reduce the ability for the conductive residue path to conduct electricity.

Also referring to FIG. 1, here are two main types of fittings 14 that can be used with the sensor probe 30 disclosed in this invention. One type of fitting 14 is made of polyethylene and has ribs. This type of fitting is designed for probes 30 that are intended to be installed in attachment surfaces such as tank walls 2 made of polyethylene using a spin welding process capable of being understood by anyone skilled in the art. For attachment surfaces or tanks not made of polyethylene, the most common type of fitting 14 is made of an elastic material, typically a material containing some kind of a rubber compound, and the fitting 14 is compressed during the installation process to provide a good seal with the attachment surface, depicted here as tank wall 2. In the embodiment shown in FIG. 1, compression occurs by rotating the threaded rod 13 relative to the threaded cap 15. The materials and techniques used can be understood by anyone skilled in the art.

Further referring to FIG. 1, fluid leakage between the threaded cap 15 and the insulating tube 12 is prevented through the use of an o-ring seal shown at 16. The o-ring seal 16 is also used to seal the gap between the conductive wire 11 and the insulating tube 12. When the threaded rod 13 is threaded all the way into the threaded cap 15, there is a good seal that prevents any leakage. The details of the implementation of this sealing method are capable of being understood by anyone skilled in the art. The embodiment shown in FIG. 1 also includes a washer, shown at 17 and two nuts, shown at 18 that help in the mounting of the sensor probe 30 into the tank wall 2 and the securing of wiring to the electrical contact 19a using electrical connection means capable of being understood by someone skilled in the art.

Figure 2:
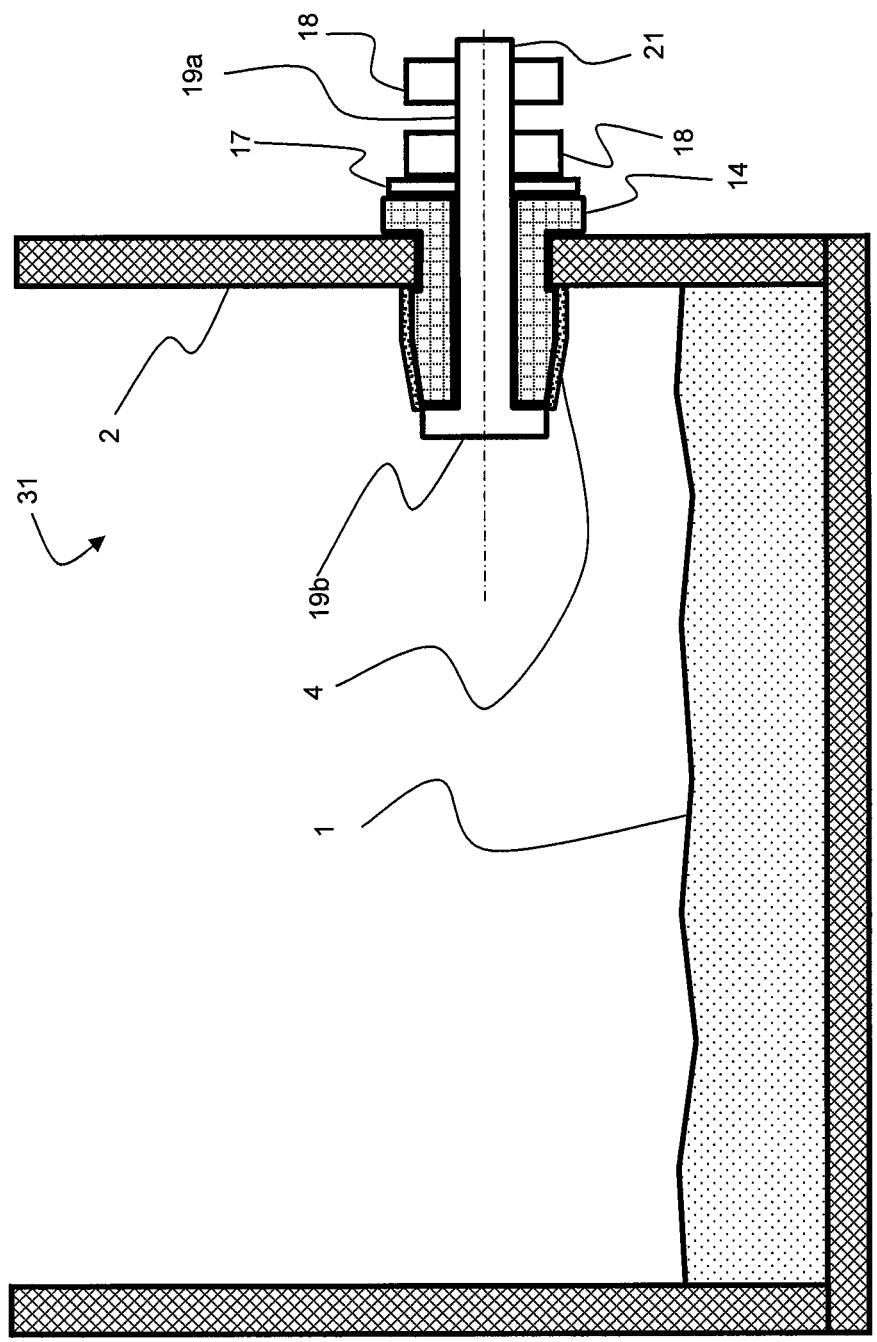
FIG. 2 shows a prior art sensor probe mounted in a wastewater holding tank of a recreational vehicle.

Referring to FIG. 2, a prior art sensor probe mounted in a wastewater holding tank of a recreational vehicle is shown at 31. The prior art probe 31 is shown mounted in a holding tank wall shown at 2. The wastewater holding tank contains a conductive liquid shown at 1. The prior art probe 31 includes a probe tip shown at 19b, an electrical contact shown at 19a, and a conductive screw, shown at 21, all of which are monolithic. The prior art probe 31 also includes a fitting shown at 14, a washer shown at 17, and two nuts shown at 18. One major difference between the prior art sensor probe 31 and the embodiment of the sensor probe shown as 30 in FIG. 1 is that the prior art residue conductive path, shown at 4, is short. This prior art conductive residue path 4 consists of the path from the probe tip along the exposed surface of the fitting 14 to the holding tank wall 2, which is typically approximately 3/8 inch (about 0.4 inches). This makes for a low resistance connection between the probe tip 19b and the tank wall 2 when conductive residue is present. When a resistivity factor for this prior art conductive residue path 4 is calculated by dividing the path length (approximately 0.375 inches) by the perimeter dimension (0.375 inches multiplied by pi) the resulting resistivity factor is approximately 0.3, which is considerably less than the resistivity factor of 5.4 that was calculated for the sensor probe 30 depicted in FIG. 1.

Figure 3:
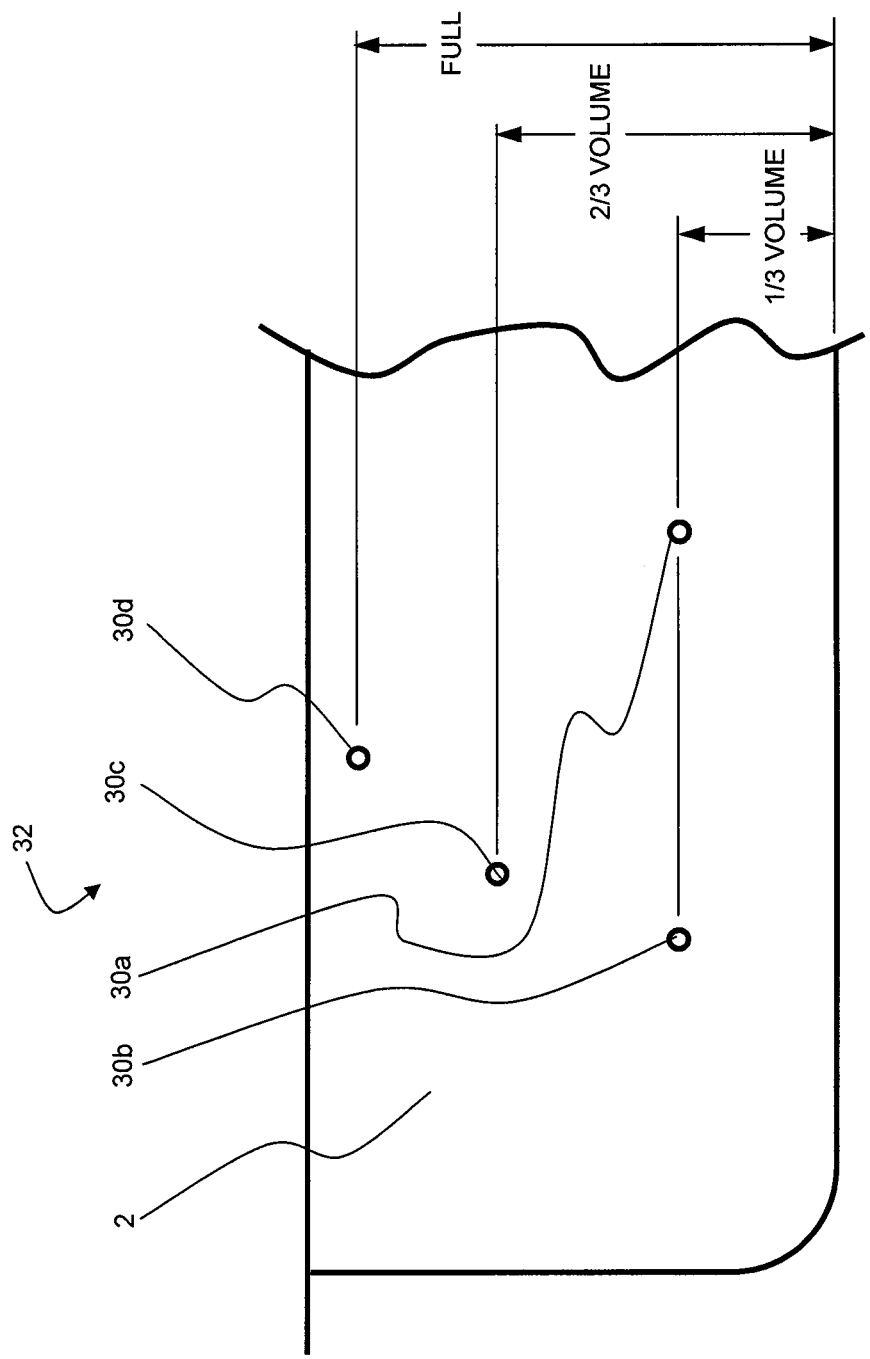
FIG. 3 illustrates a typical configuration for mounting sensor probes into the wall of a wastewater tank.

Referring to FIG. 3, a tank with sensor probes is illustrated at 32. This is an end view of the sensor probes shown from outside the holding tank in a typical configuration. The holding tank wall is shown at 2 and four sensor probes are shown at 30a, 30b, 30c, and 30d. A ground probe is shown at 30a and is typically located 1/3 of the way up from the floor of the tank. A 1/3 probe is shown at 30b and is also typically located 1/3 of the way up from the floor of the tank and at least 10 inches away from the ground probe 30a to minimize the leakage currents caused by conductive residue on the holding tank wall 2. A 2/3 probe is shown at 30c and is located 2/3 of the way up from the floor of the tank and at least 10 inches from the ground probe 30a. This minimizes leakage currents from the ground probe 30a to the 2/3 probe 30c. However the distance between the 1/3 probe 30b and the 2/3 probe 30c is often much less than 10 inches, which creates a high potential for leakage currents between these two points. A full probe is shown at 30d and is located near the top of the tank and at least 10 inches from the ground probe 30a. This full probe 30d is often much less than 10 inches from the 1/3 probe 30b and the 2/3 probe 30c creating a high potential for leakage currents between these points. Because of the difficulty of accessing the tank and placing wires, there is a desire to keep the sensor probes (30a, 30b, 30c, and 30d) close together. This is another reason why increasing the resistance between the probe tips (19b in FIG. 1) and the holding tank wall 2 is beneficial in making a simple and residue tolerant holding tank liquid level monitoring system.

Figure 4:
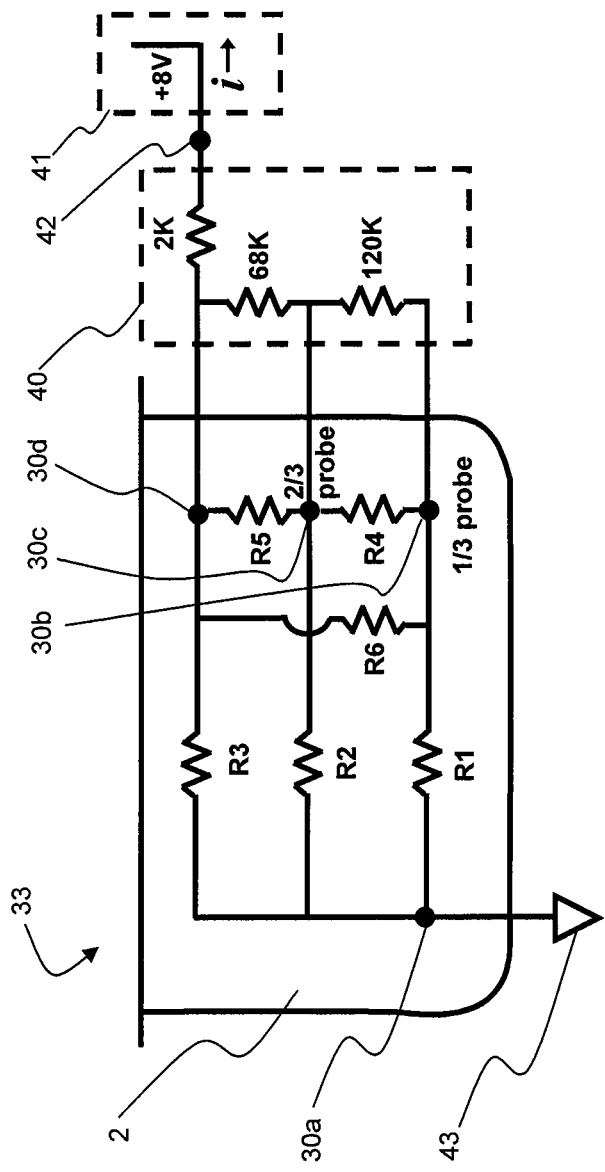
FIG. 4 diagrams a typical circuit for measuring liquid level in a recreational vehicle holding tank.

Referring to FIG. 4, a holding tank with sensor probes and a resistor block is shown at 33. The holding tank wall is shown at 2 and four sensor probes are shown at 30a, 30b, 30c, and 30d. Resistances between pairs of sensor probes are shown as R1, R2, R3, R4, R5, and R6. In an ideal system that has no leakage currents between sensor probe pairs and where at least one probe in the pair is not submerged, the resistance between a pair of sensor probes should be infinite (i.e. an open circuit). In typical systems, the resistance between submerged sensor probes through the conductive liquid is on the order of 5 KΩ to 50 KΩ. There can be a large variation in these resistances through the conductive liquid as a result of variations in the materials suspended in the wastewater. To simplify and reduce the cost of wiring, the electrical contacts from the 1/3 probe 30b, the 2/3 probe 30c, and the full probe 30d are typically wired together through a resistor block shown at 40. The resistances shown for this resistor block 40 are typical, but they can be any values that work effectively to create discrete bands of current for a particular voltage as shown in the table on FIG. 4. The ground probe 30a is typically wired to ground. By using a resistor block 40 in this way, only one wire needs to go the liquid level measurement instrument, shown at 41. The measurement instrument 41 can be any electrical or electronic device that can measure the resistance between the electrical input point, shown at 42, and the electrical ground, shown at 43. A typical approach used by those skilled in the art incorporates an 8 volt source, a circuit that measures the resulting current, and a circuit that turns on light emitting diodes (LEDs) based on the amount of current between the 8 Volt source and electrical ground 43.

Figure 5:
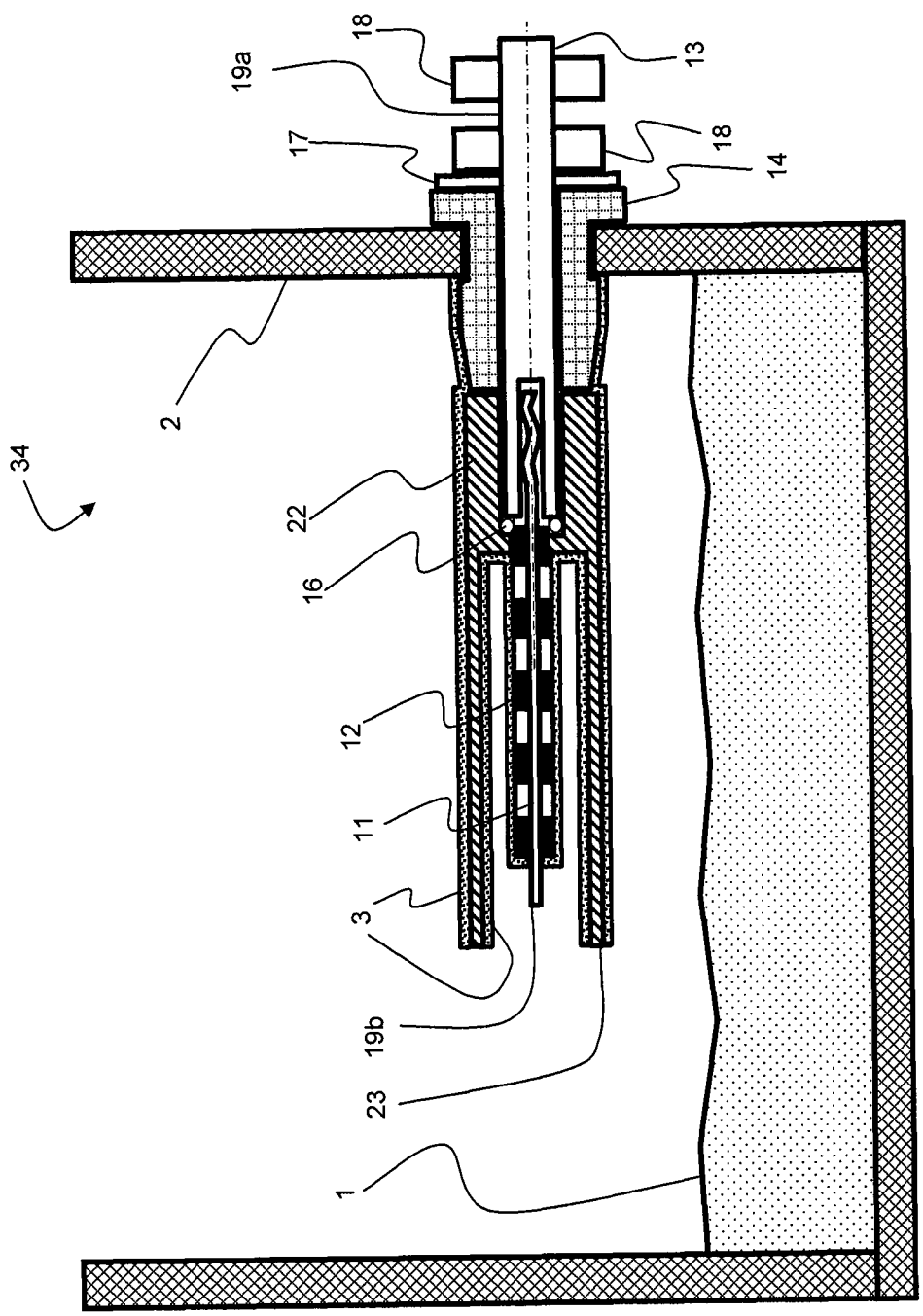
FIG. 5 presents a sensor probe with a fully shielded probe tip mounted in a wastewater holding tank of a recreational vehicle.

Referring to FIG. 5, a sensor probe with a fully shielded probe tip is shown at 34. This embodiment of the present invention is mounted into the wall of a holding tank shown at 2 that contains a conductive liquid shown at 1. The sensor probe with a fully shielded probe tip 34 includes a probe tip shown at 19b, an electrical contact shown at 19a. The tip 19b and contact 19a are electrically connected through a conductive threaded rod, shown at 13 and an electrically conductive wire shown at 11. The fully shielded probe tip includes a fitting shown at 14, a washer shown at 17, and two nuts shown at 18. The sensor probe 34 shown in this figure includes an insulating tube, shown at 12, which covers the wire 11. One major difference between the embodiment shown in FIG. 1 and the embodiment shown in FIG. 5 is that the sensor probe shown in FIG. 5 has a threaded cap with a full shield, shown at 22. This threaded cap with a full shield 22 is made of a non-conductive material, such as acetal, polytetrafluoroethylene, or any other non-conductive material capable of being understood by anyone skilled in the art. If the cap 22 is made of a non-wetting material, the behavior of the system is better because less conductive residue will build up on the surface of the cap 22. Fluid leakage between the threaded cap with a full shield 22 and the insulating tube 12 is prevented through the use of an o-ring seal shown at 16. The o-ring seal 16 is also used to seal the gap between the conductive wire 11 and the insulating tube 12. When the threaded rod 13 is threaded all the way into the threaded cap 15, there is a good seal that prevents any leakage. The details of the implementation of this sealing method are capable of being understood by anyone skilled in the art.

Further referring to FIG. 5, the full shield on the threaded cap 22 provides three benefits. Benefit 1: the full shield prevents the deposition of fibrous waste such as toilet paper from touching the wire. This is especially beneficial in black water tanks, which take toilet waste. Benefit 2: the full shield includes an edge shown at 23, which creates a 180-degree change in direction. Due to surface tension affects, liquid tends not to accumulate on such a edge, which means that conductive residue also tends not to accumulate. This creates an additional resistance barrier in the conductive residue path, shown at 3. The benefit of this edge 23 is sensitive to the thickness of the shield. It can be a maximum of 1/32 of an inch, a maximum of 1/16 of an inch, a maximum of 3/32 of an inch, a maximum of 1/8 inch, or a maximum of 5/32 inch. The edge 23 illustrated here is made of two 90-degree corners. Each of these corners can have a radius. Making these radii as small as possible will improve the ability to shed droplets. The corners can have a maximum radius or 5/64 inch, 1/16 inch, 3/64 inch, 1/32 inch, or 1/64 inch. The edge 23 does not need to be a total of a 180 degree change of direction. It can also be a at least 170 degrees, at least 160 degrees, at least 150 degrees, at least 140 degrees, at least 130 degrees, at least 120 degrees, at least 110 degrees, at least 100 degrees, at least 90 degrees, or at least 80 degrees. The edge 23 does not need to be comprised of two corners. The edge 23 can be a single corner. The edge 23 can be more than two corners. The corners do not need to be an equal number of degrees. They can be any combination of angles that add up to the minimum number of degrees specified above. Benefit 3: the conductive residue path 3 between the probe tip and the holding tank wall 2 is lengthened and the resistivity factor is increased as a result of the additional distance that current must travel on its way between probe tip 19b and the holding tank wall 2. This is visible in the gap or free space shown between the threaded cap with a full shield 22 and the insulating tube 12. In a typical configuration the full shield is about 1 inch in length. This increases the path length by 2 inches, one inch on the inside and one inch on the outside. Assuming all of the other dimensions are the same as for the embodiment shown in FIG. 1, the total length of the conductive residue path 3 between the probe tip 19*b* and the holding tank wall 2 for the sensor probe with a fully-shielded probe tip 34 would be approximately 3.5 inches. Assuming that all other dimensions are the same as the embodiment shown in FIG. 1 and assuming an outside diameter of 0.35 inches an inside diameter of 0.3 inches and a length of 1 inch for the full shield, the additional resistivity factor for the sensor probe with a fully-shielded probe tip 34 would be approximately 1/(0.35×3.14)+1/(0.3×3.14) or approximately 2.0 making a total resistivity factor for this configuration of approximately 7.4.

Figure 6:
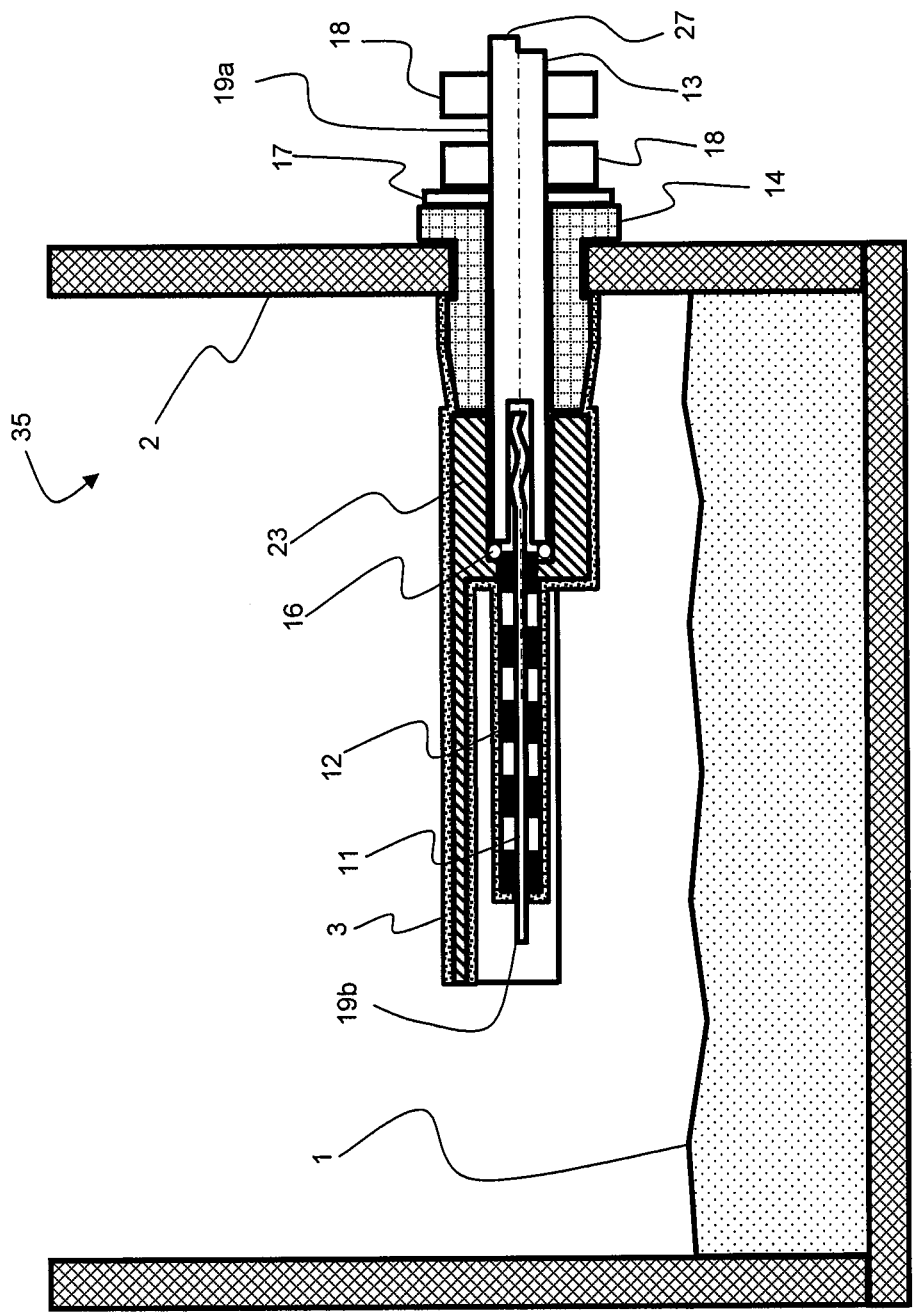
FIG. 6 displays a sensor probe with a partially shielded probe tip mounted in a wastewater holding tank of a recreational vehicle.

Referring to FIG. 6, a sensor probe with a partially shielded probe tip is shown at 35. This embodiment of the present invention is mounted into the wall of a holding tank shown at 2 that contains a conductive liquid shown at 1. The sensor probe with a partially shielded probe tip 35 includes a probe tip shown at 19*b*, an electrical contact shown at 19*a*, and many of the same components as the sensor probe with a fully shielded probe tip shown at 34 in FIG. 5 including an electrically conductive wire 11, an insulating tube 12, a conductive threaded rod 13, a fitting 14, an o-ring seal 16, a washer 17, and two nuts 18. The difference between the embodiment shown as 34 in FIG. 5 and the embodiment shown as 35 in FIG. 6 is that the embodiment shown in FIG. 6 uses a threaded cap with a partial shield shown at 24 instead of the threaded cap with a full shield shown as 22 in FIG. 5. Thus, the length of the conductive residue path, shown as 3 in FIG. 6, will be approximately the same for a typical configuration as was calculated for the embodiment shown in FIG. 1 and the resistivity factor will also be approximately the same as for the embodiment shown in FIG. 1. The sensor probe with a partially shielded probe tip 35 does have one of the benefits of the sensor probe with a full-shielded probe tip shown as 34 in FIG. 5 in that partial shield prevents the deposition of fibrous waste such as toilet paper from touching the wire 11, insulating tube 12, and probe tip 19*b*, which is beneficial in tanks that may contain larger objects or fibrous waste such as the black water holding tanks of a recreational vehicle that may contain toilet waste.

Figure 7:
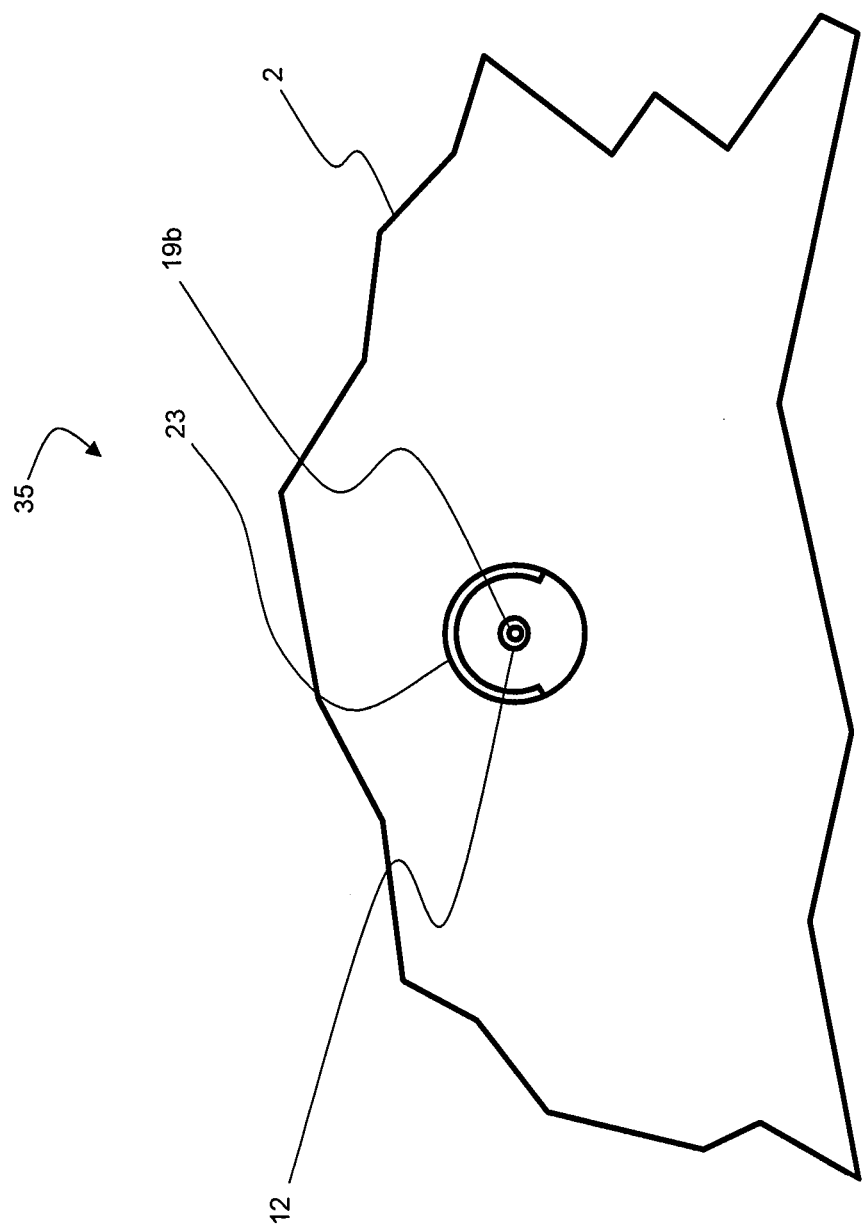
FIG. 7 shows an end view of the alternate sensor probe embodiment with a partially shielded probe tip as seen from inside the tank.

Referring to FIG. 7, an end view from inside the tank of a sensor probe with a partially shielded probe tip is shown at 35. This is the same sensor probe that was illustrated from a cutaway side view in FIG. 6. This embodiment of the present invention is mounted into the wall of a holding tank shown at 2. The probe tip is shown at 19*b*, the insulating tube is shown at 12, and the threaded cap with a partial shield is shown at 24. This end view shows the orientation of the shield to encompass the upper half to the assembly. In order to ensure that the probe is correctly oriented when this embodiment is used, there is an orientation feature placed on a surface visible from the outside of the probe. One example of how this can be done is by milling a flat on the bottom half of the conductive threaded rod. Such an orientation feature is shown at 27 in FIG. 6. This orientation feature or mark can be made in a variety of other ways capable of being understood by anyone skilled in the art.

Figure 8:
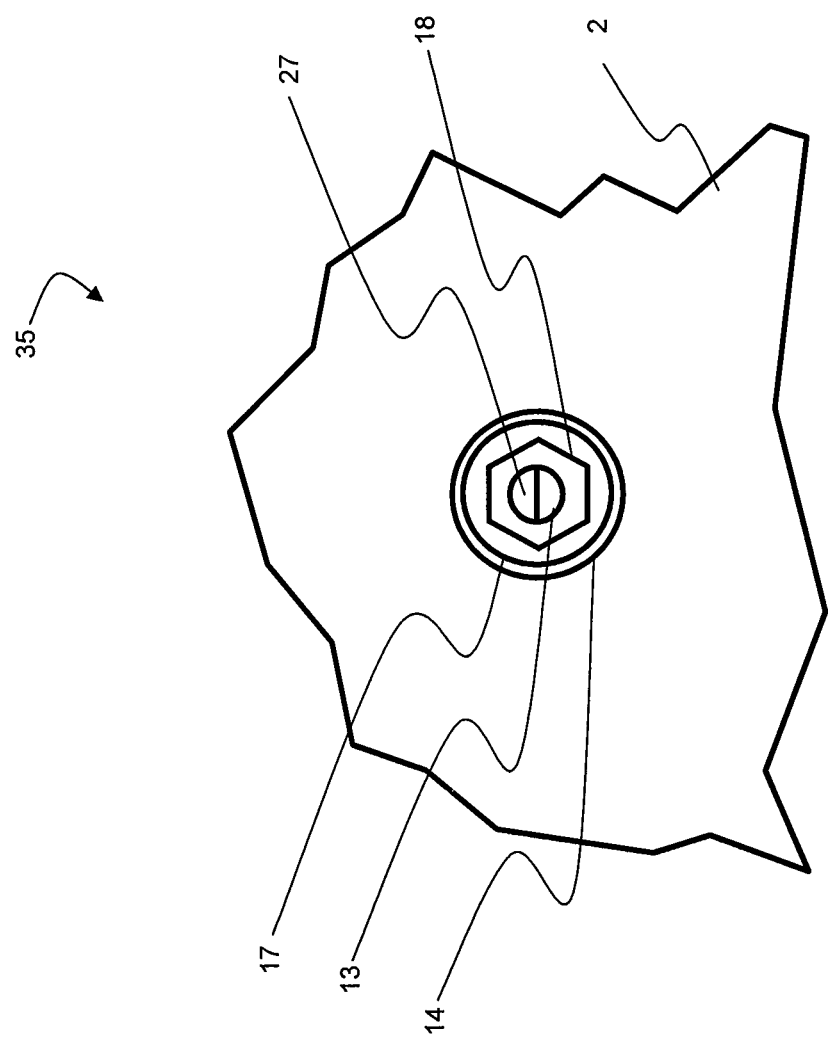
FIG. 8 shows an end view of the alternate sensor probe embodiment with a partially shielded probe tip as seen from outside the tank.

Referring to FIG. 8, an end view from outside the tank of a sensor probe with a partially shielded probe tip is shown at 35. This is the same sensor probe that was illustrated from a cutaway side view in FIG. 6. This embodiment of the present invention is mounted into the wall of a holding tank shown at 2. The conductive threaded rod is shown at 13, the fitting is shown at 14, the washer is shown at 17, and a nut is shown at 18. To ensure that the probe is correctly oriented when this embodiment is used, there is an orientation feature, shown at 27. One example of such an orientation feature 27 is by milling a flat on the bottom half of the conductive threaded rod 12. This orientation feature or mark can be made in a variety of other ways capable of being understood by anyone skilled in the art.

Figure 9:
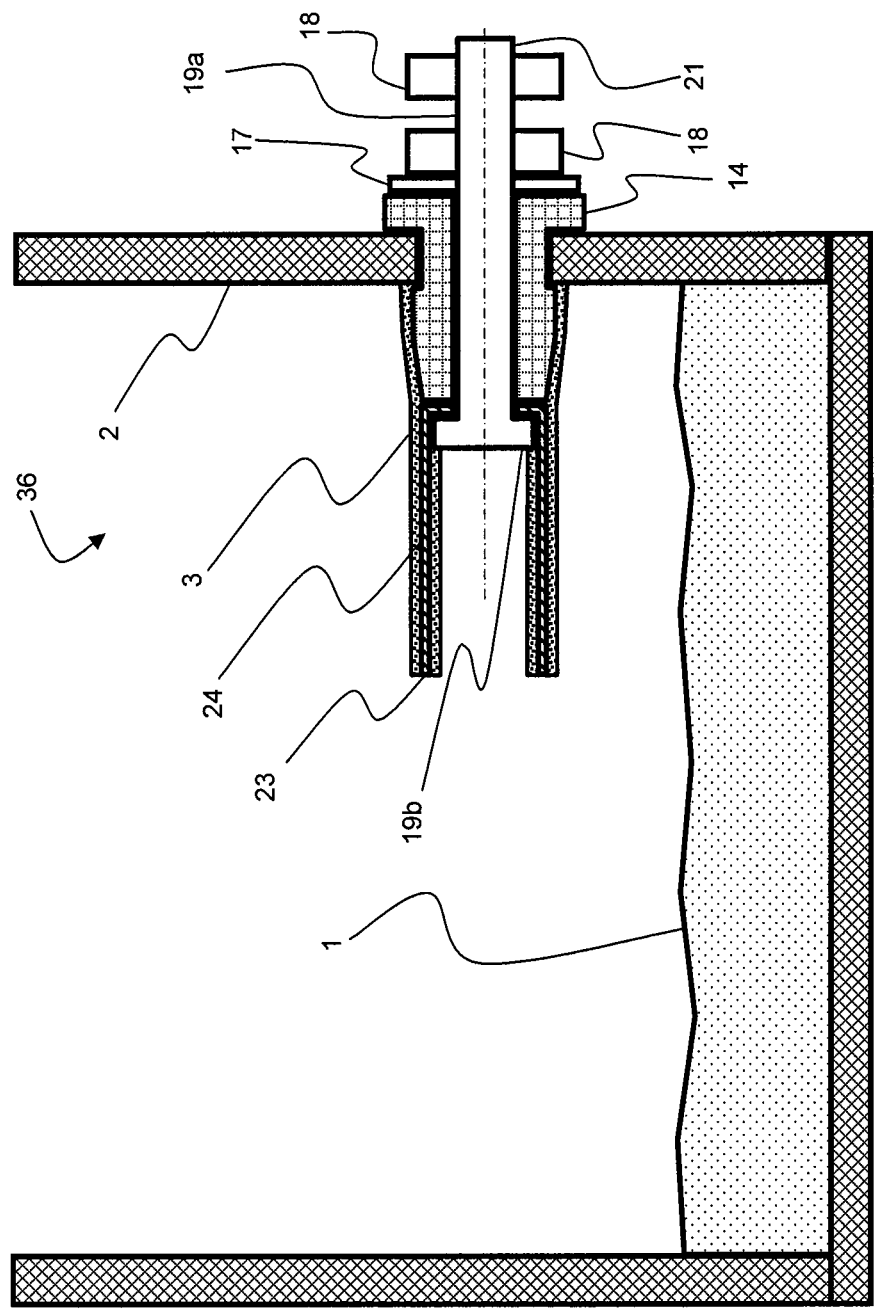
FIG. 9 shows a sensor probe with a cylindrical probe tip shield mounted in a wastewater holding tank of a recreational vehicle.

Referring to FIG. 9, a sensor probe with a cylindrical probe tip shield is shown at 36. This embodiment of the present invention is mounted into the wall of a holding tank shown at 2 that contains a conductive liquid shown at 1. The sensor probe with a cylindrical probe tip shield 36 includes a probe tip shown at 19*b*, an electrical contact shown at 19*a*, and many of the same components as the prior art probe shown as 31 in FIG. 2 including a fitting shown at 14, a washer shown at 17, two nuts shown at 18, and a conductive screw shown at 21. The difference between the prior art illustrated in FIG. 2 and the embodiment shown as 36 in FIG. 9 is the addition of a cylindrical non-conductive shield shown as 25. This shield has the same three benefits described previously for the shield that is part of the embodiment shown at 34 in FIG. 5. In particular, the shield on the threaded cap 22 in FIG. 5 and the cylindrical non-conductive shield have the following three benefits. Benefit 1: the full shield prevents the deposition of fibrous waste such as toilet paper from touching the probe tip 19*b*. This is especially beneficial in black water tanks, which take toilet waste. Benefit 2: the shield includes an edge shown at 23. Due to surface tension affects, liquid tends not to accumulate on such an edge 23, which means that conductive residue also tends not to accumulate. This creates an additional resistance barrier in the conductive residue path, shown at 3. The benefit of this edge 23 is sensitive to the thickness of the shield. It can be a maximum of 1/32 of an inch, a maximum of 1/16 of an inch, a maximum of 3/32 of an inch, a maximum of 1/8 inch, or a maximum of 5/32 inch. More details about the characteristics and options for this edge are described in the part of this disclosure that discusses FIG. 5. Benefit 3: the conductive residue path 3 between the probe tip and the is lengthened and the resistivity factor is increased as a result of the additional distance that current must travel on its way between probe tip 19*b* and the holding tank wall 2. In a typical configuration the full shield is about 1 inch in length. This increases the path length by 2 inches, one inch on the inside and one inch on the outside. Assuming all of the other dimensions are the same as for the embodiment shown in FIG. 2, the total length of the conductive residue path 3 between the probe tip 19*b* and the holding tank wall 2 for the sensor probe with a cylindrical probe tip shield 36 would be approximately 2⅜ inches. Assuming that all other dimensions are the same as the embodiment shown in FIG. 2 and assuming an outside diameter of 0.35 inches an inside diameter of 0.3 inches and a length of 1 inch for the full shield, the additional resistivity factor for the sensor probe with a fully-shielded probe tip 34 would be approximately 1/(0.35×3.14)+1/(0.3×3.14) or approximately 2.0 making a total resistivity factor for this configuration of approximately 2.3.

Figure 10:
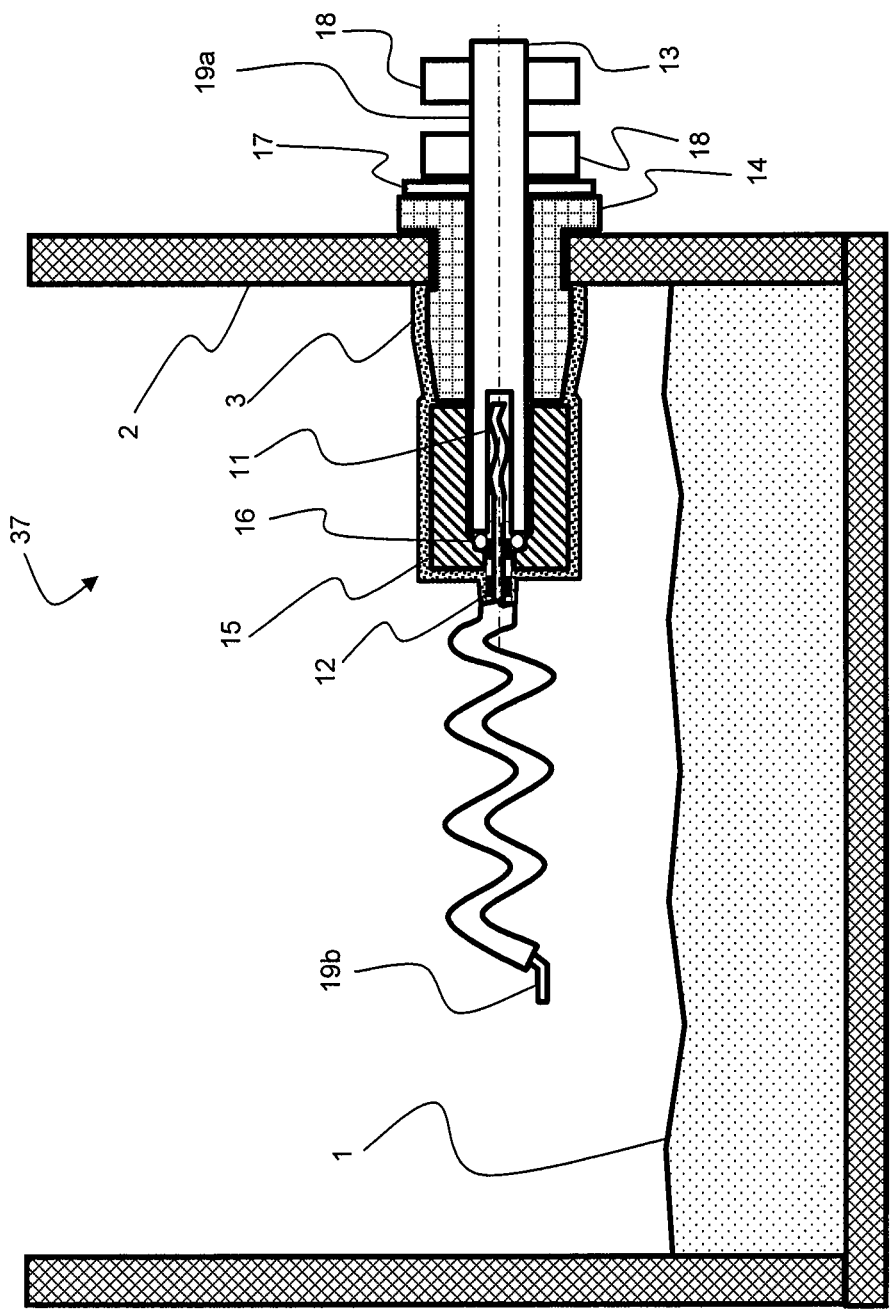
FIG. 10 shows a sensor probe with a corkscrew configuration mounted in a wastewater holding tank of a recreational vehicle.

Referring to FIG. 10, a sensor probe with a corkscrew configuration is shown at 37. This embodiment of the present invention is mounted into the wall of a holding tank shown at 2 that contains a conductive liquid shown at 1. The sensor probe with a corkscrew configuration 37 includes a probe tip shown at 19*b*, an electrical contact shown at 19*a*, and many of the same components as the sensor probe with a fully shielded probe tip shown as 30 in FIG. 1 including an electrically conductive wire 11, an insulating tube 12, a conductive threaded rod 13, a fitting 14, an insulated threaded cap 15, an o-ring seal 16, a washer 17, and two nuts 18. The difference between the embodiment shown as 30 in FIG. 1 and the embodiment shown as 37 in FIG. 10 is that the embodiment shown in FIG. 10 further twists the wire 11 and insulating tube 12 into a helical configuration which increases the effective length of the conductive residue path 3 between the probe tip 19b and holding tank wall 2 and has a similar impact on the resistivity factor for a sensor probe of equal total length. For example, if this corkscrew configuration doubles the conductive residue path length along the insulating tube 12 from the ¾ inches of a typical configuration as illustrated in FIG. 1 and all other parameters were left the same, the total path length would increase from 1½ inches to 2¼ inches and the resistivity factor would increase from 5.4 to 10.2 for a sensor probe that that can fit into the same overall dimensions. The use of a bent conductor configuration of the type illustrated by the corkscrew configuration of the electrically conductive wire 11 and insulating tube 12 is not restricted the use of a corkscrew or helix configuration, the bent conductor configuration could be in any of a variety of other formats including but not limited to a zig-zag, a u-shape, or a spiral, any of which can create a total length of the conductive path between the electrical contact 19a and the probe tip 19b that is more than 110%, 120%, 130%, 140%, or 150% of the length of a straight line between the contact 19a and the probe tip 19b.

Figure 11:
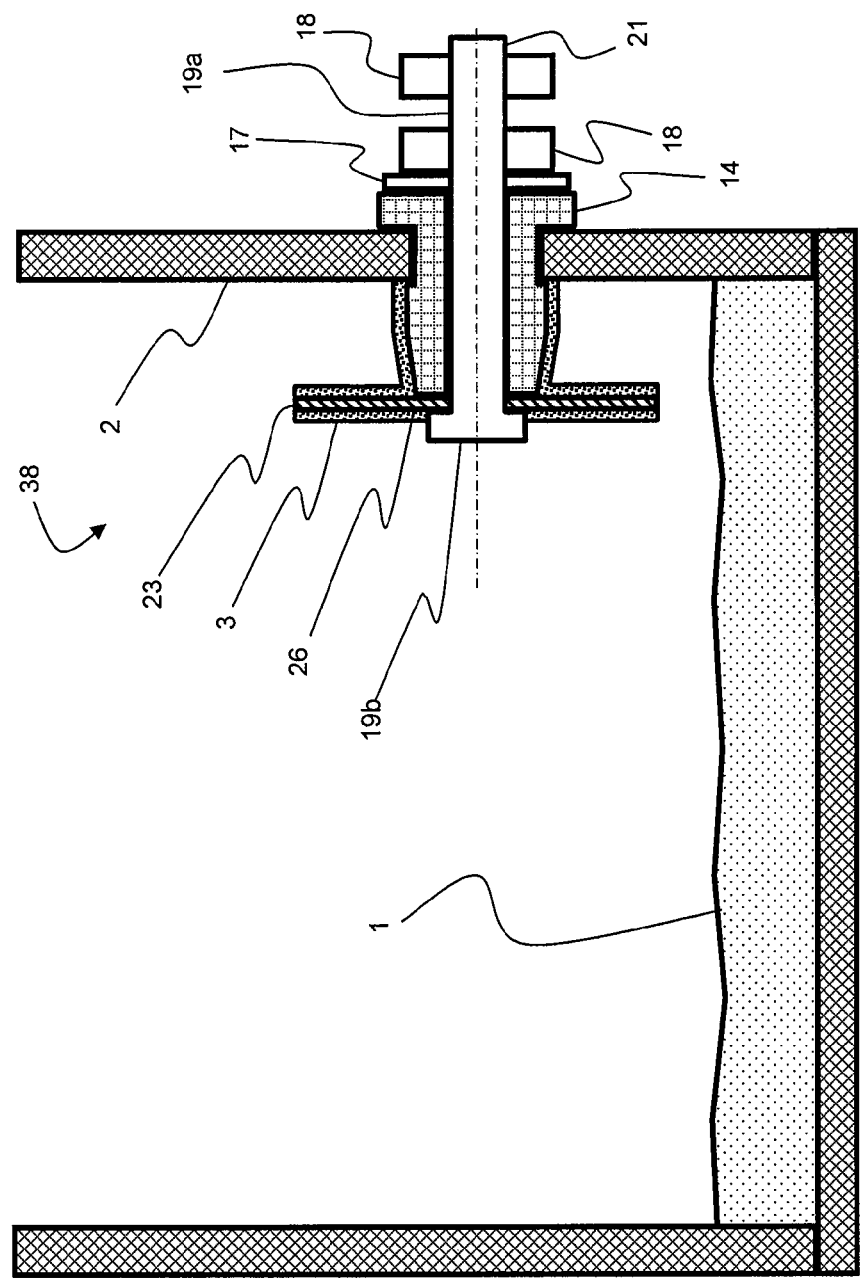
FIG. 11 shows a sensor probe with a disk-shaped tip shield mounted in a wastewater holding tank of a recreational vehicle.

Referring to FIG. 11, a sensor probe with a disk-shaped tip shield is shown at 38. This embodiment of the present invention is mounted into the wall of a holding tank shown at 2 that contains a conductive liquid shown at 1. The sensor probe with a disk-shaped shield 38 includes a probe tip shown at 19b, an electrical contact shown at 19a, and many of the same components as the prior art probe shown as 31 in FIG. 2 including a fitting shown at 14, a washer shown at 17, two nuts shown at 18, and a conductive screw shown at 21. The difference between the prior art illustrated in FIG. 2 and the embodiment shown as 38 in FIG. 11 is the addition of a disk-shaped circular non-conductive shield shown as 26. This disk-shaped shield 26 has two of the three benefits as the shield that is part of the embodiment shown at 34 in FIG. 5. Benefit 1: the disk-shaped shield 26 includes an edge shown at 23. Due to surface tension affects, liquid tends not to accumulate on such an edge 23, which means that conductive residue also tends not to accumulate. This creates an additional resistance barrier in the conductive residue path, shown at 3. The benefit of this edge 23 is sensitive to the thickness of the shield. It can be a maximum of 1/32 of an inch, a maximum of 1/16 of an inch, a maximum of 3/32 of an inch, a maximum of ⅛ inch, or a maximum of 5/32 inch. More details about the characteristics and options for this edge are described in the part of this disclosure that discusses FIG. 5. Benefit 2: the conductive residue path 3 between the probe tip and the is lengthened and the resistivity factor is increased as a result of the additional distance that current must travel on its way between probe tip 19b and the holding tank wall 2. In a typical configuration the disk-shaped shield 26 is about 1⅛ inch in diameter. This increases the path length by ¾ inches, ⅜ inch on each side of the disk-shaped shield 26. Assuming all of the other dimensions are the same as for the embodiment shown in FIG. 2, the total length of the conductive residue path 3 between the probe tip 19b and the holding tank wall 2 for the sensor probe with a disk-shaped tip shield 38 would be approximately 1⅛. Assuming that all other dimensions are the same as the embodiment shown in FIG. 2 and assuming a maximum diameter of 1.125 inches and a minimum diameter of 0.375 inches, the additional resistivity factor for the sensor probe with a disk-shaped tip shield 38 would be approximately 0.3 making a total resistivity factor for this configuration of approximately 0.6.

Figure 12:
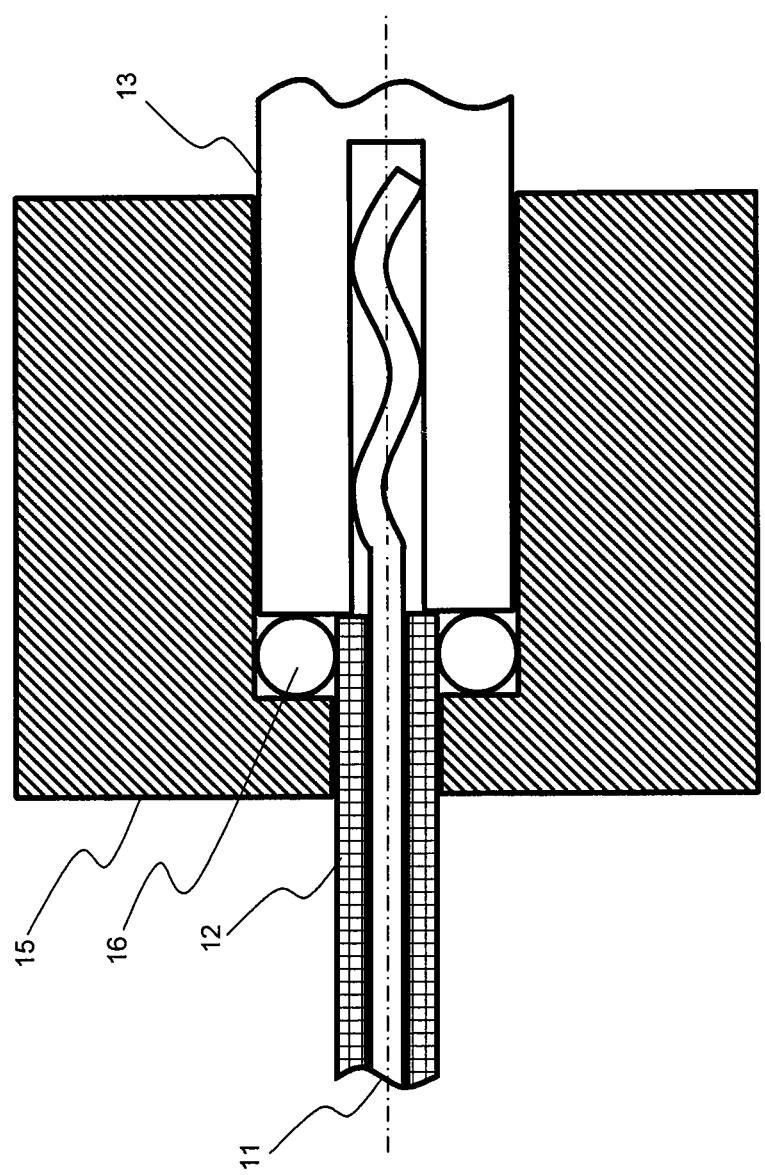
FIG. 12 shows a detail of the o-ring seal used in the embodiments shown in FIG. 1, FIG. 5, FIG. 6, FIG. 7, and FIG. 10.

FIG. 12 illustrates the detail of the o-ring seal configuration used in the embodiments shown in FIG. 1, FIG. 5, FIG. 6, FIG. 7, and FIG. 10 by showing a larger view of the relationship between the electrically conductive wire shown at 11, the insulating tube shown at 12, the electrically conductive threaded rod shown at 13, the threaded cap shown at 15, and the o-ring seal shown at 16. Note that the threaded cap 15 in this diagram is substituted by a threaded cap with a full shield 22 in FIG. 5 and by a threaded cap with a partial shield 24 in FIG. 6 and FIG. 7, but that this does not change the overall configuration of the o-ring seal 16 relative to the other components. Note also that the o-ring seal 16 is used to prevent leakage between the insulating tube 12 and the wire 11 as well as between the insulating tube 11 and the threaded cap 15. Further implementation details and variations can be understood and made by anyone skilled in the art.

Figure 13:
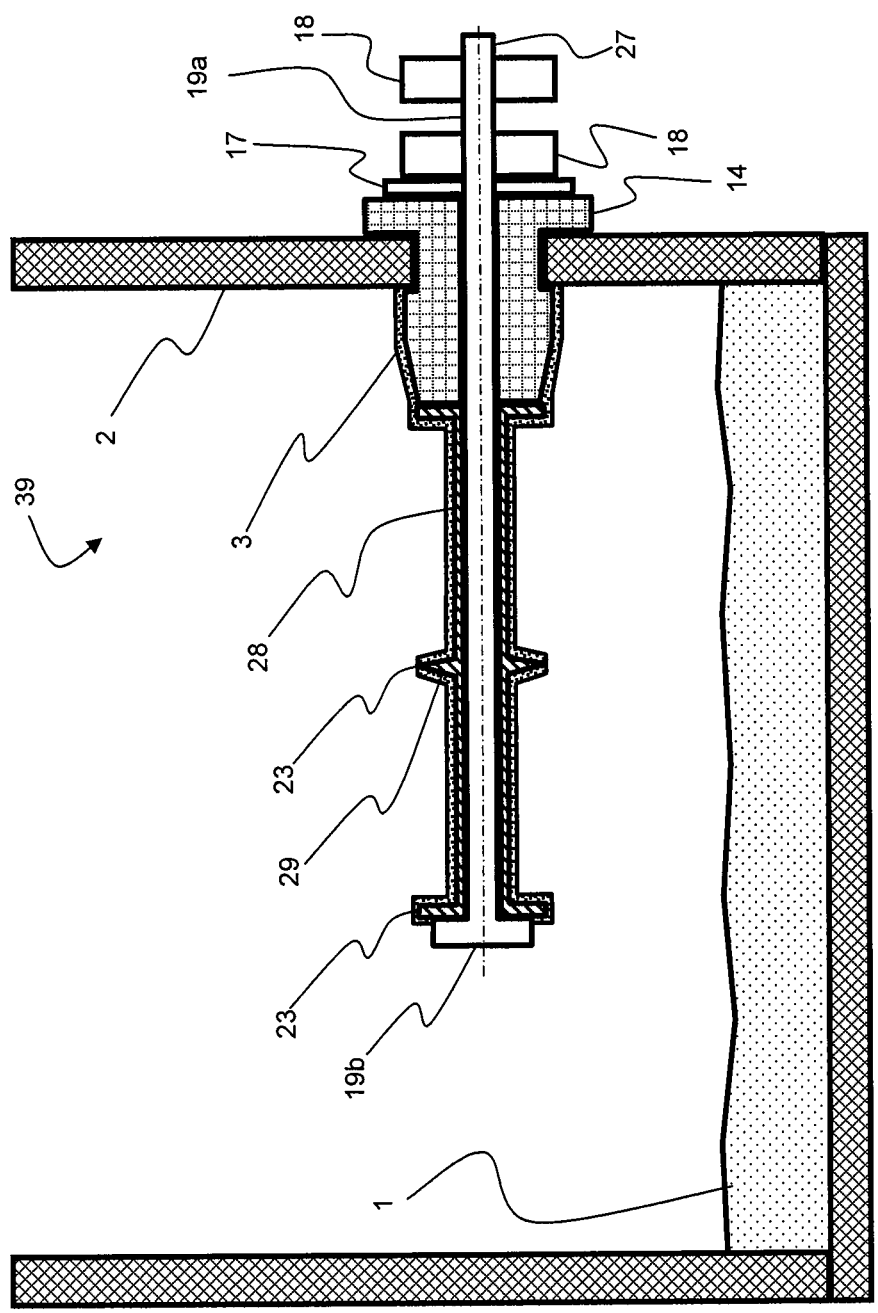
FIG. 13 shows a sensor probe with an insulating spacer mounted in a wastewater holding tank of a recreational vehicle.

Referring to FIG. 13, a sensor probe with an insulating spacer is shown at 39. This embodiment of the present invention is mounted into the wall of a holding tank shown at 2 that contains a conductive liquid shown at 1. The sensor probe with an insulating spacer shield 39 includes a probe tip shown at 19b, an electrical contact shown at 19a, and many of the same components as the prior art probe shown as 31 in FIG. 2 including a fitting shown at 14, a washer shown at 17, two nuts shown at 18, and a long narrow conductive screw shown at 27. One of the differences between the prior art illustrated in FIG. 2 and the embodiment shown as 38 in FIG. 13 is the addition of an insulating spacer shown at 28. This insulating spacer increases the length of the path from the probe tip 19b to the holding tank wall 2. In the embodiment shown in FIG. 13 the length of the insulating spacer 28 is 2 inches, which takes the path length from about 0.4 inches for the prior art probe 31 illustrated in FIG. 2 to over 2.4 inches for the sensor probe with insulating spacer 39 shown in FIG. 13. The actual path length is greater than the length of the insulating spacer 28 because there has also been a baffle, shown at 29 included in the sensor probe with insulating spacer 39. This baffle 39 is optional. The change in direction of the baffle is 120-degrees or more in this embodiment, but other embodiments could have a change in direction of 100-, 150- or 180-degrees or more. The radius of the change in direction could be less than 5/32, 5/64, 1/16, 3/64, 1/32, or 1/64 inch in various embodiments. There can also be multiple baffles 39, each of which can have an impact similar to a small version of the disk-shaped tip shield that was shown as 26 in FIG. 11. Note that the baffle 39 also has an edge 23 with some of the same characteristics and benefits as the edges that were shown at 26 in FIG. 5, FIG. 9 and FIG. 11. It is further worth noting that the insulating spacer 28 also has a reduced cross section (or diameter, since the embodiment shown here is cylindrical). This reduced cross section was facilitated by replacing the conductive screw, shown at 21 in FIG. 2, which typically has a 3/16 outside diameter (10-32 thread) with a smaller 4-40 thread that has an outside diameter of 0.112 inches for the long narrow conductive screw 27 and then using an insulating spacer 28 with a 0.29 inch wall thickness to give a total diameter of the insulating spacer 28 of 0.160 inches and a perimeter of approximately 0.5 inches. If this narrow cross section is maintained over 1.75 inches of the spacer, it creates an increase in resistivity factor of approximately 1.75/0.5 or 3.5 over the prior art probe 31 illustrated in FIG. 2, making the total resistivity factor approximately 3.8, a more than 12-fold increase over the prior art that was illustrated in FIG. 2. The insulating spacer 28 could be made of a single component, such as the injection molded acetal part shown in FIG. 13. The insulating spacer 28 could also be made of multiple elements such as an insulating tube 11 in FIG. 1 plus a threaded cap 15 in FIG. 1. In this case, the threaded cap would be threaded all the way through and the insulating tube 11 would cover the threads of the long narrow conductive screw shown at 27 in FIG. 13 between the screw head and the threaded cap.

A number of variations and modifications of the disclosed embodiments can also be used. The principles described here can also be used for in applications other than recreational vehicles such as bioreactors, etc. While the principles of the disclosure have been described above in connection with specific apparatuses and methods, it is to be clearly understood that this description is made only by way of example and not as limitation on the scope of the disclosure.

What is claimed is:

1. A single-terminal moving wastewater holding tank sensor probe for use in determining presence of conductive liquid within a wastewater holding tank, the single-terminal moving wastewater holding tank sensor probe comprising:
    an electrical terminal configured for wiring into a level measuring circuit, wherein:
        an electrical connection to the electrical terminal is configured to pass a time-invariant electrical signal with a constant voltage applied during normal operation while determining presence of conductive liquid within the wastewater holding tank, and
        the electrical terminal is configured for electrical connection to other probes during normal operation that collectively measure a level of the conductive liquid in the wastewater holding tank;
    an electrical contact configured for wiring into a level measuring circuit;
    a probe tip configured for contact with fluid within the wastewater holding tank during normal operation;
    an electrical conductor for electrically coupling the electrical terminal and the probe tip,
        whereby the electrical conductor is configured for installation through an aperture in the wastewater holding tank during normal operation, and
        wherein only one conductive element passes through the aperture;
    an electrical insulator at least partially encapsulating the electrical conductor, wherein:
        the electrical insulator comprises a non-conductive material having an exposed surface that is configured to be in contact with any fluid in the wastewater holding tank in the region between the aperture and the probe tip, wherein:
            the non-conductive material comprises a tubular portion aligned with an axis of the electrical conductor, and
            the tubular portion has a circular geometry with an outside diameter of less than a quarter inch, and
            a path from the probe tip and along the exposed surface toward the aperture, during normal operation, wherein the path comprises a length-to-width ratio that exceeds 2.0, and wherein the length to-width ratio is a length of a conductive residue path on the exposed surface in a direction substantially parallel with the electrical conductor divided by the width of the conductive residue path on the exposed surface in a direction perpendicular to the length; and
    a fitting suitable for sealing the aperture, wherein the fitting is annularly configured around at least one of the electrical terminal and the electrical conductor.

2. The single-terminal moving wastewater holding tank sensor probe for use in determining presence of conductive liquid within the wastewater holding tank as recited in claim 1, wherein:
    the electrical terminal is threaded;
    the probe is configured for mounting horizontally into the wall of the holding tank of a recreational vehicle;
    a path from the probe tip and along the exposed surface away from the probe tip to a most proximate point on a wall of the tank passes a distance that exceeds ¾ inch; and
    the single terminal is configured for electrically connecting to other probes through a resistor block in a network capable of providing readings of multiple levels when connected to a constant current source.

3. The single-terminal moving wastewater holding tank sensor probe for use in determining presence of conductive liquid within the wastewater holding tank as recited in claim 1, wherein the path has the length-to-width ratio that exceeds one of 2.5, 3.0, 3.5, 4.0, 4.5, 5.0, 5.5, and 6.0.

4. The single-terminal moving wastewater holding tank sensor probe for use in determining presence of conductive liquid within the wastewater holding tank as recited in claim 1, wherein at least two of the electrical terminal, the electrical conductor and the probe tip are monolithic.

5. The single-terminal moving wastewater holding tank sensor probe for use in determining presence of conductive liquid within the wastewater holding tank as recited in claim 1, wherein:
    at least part of the electrical insulator is non-wetting, and
    at least part of the insulator comprises polytetrafluroethylene.

6. The single-terminal moving wastewater holding tank sensor probe for use in determining presence of conductive liquid within the wastewater holding tank as recited in claim 1, wherein:
    at least one part of the electrical insulator has a cross-section perpendicular to a line between the probe tip and the electrical terminal,
    the one part is at least one of ⅛ inch, ¼ inch, ⅜ inch, ½ inch, ⅝ inch, and ¾ inch long, and
    the cross-section is less than one of 1/16 inch, 3/32 inch, ⅛ inch, 5/32 inch, 3/16 inch, 7/32 inch, ¼ inch, 9/32 inch, and 5/16 inch across.

7. The single-terminal moving wastewater holding tank sensor probe for use in determining presence of conductive liquid within the wastewater holding tank as recited in claim 1, further comprising an orientation mark fixed relative to the electrical conductor configured to be visible from outside from the wastewater holding tank.

8. The single-terminal moving wastewater holding tank sensor probe for use in determining presence of conductive liquid within the wastewater holding tank as recited in claim 1, further comprising a shield that can be positioned to prevent the accumulation of debris on the probe tip.

9. The single-terminal moving wastewater holding tank sensor probe for use in determining presence of conductive liquid within the wastewater holding tank as recited in claim 1, wherein the fitting is elastic.

10. The single-terminal moving wastewater holding tank sensor probe for use in determining presence of conductive liquid within the wastewater holding tank as recited in claim 1, wherein the fitting is suitable for spin welding.

11. A single-terminal holding tank sensor probe for use in determining presence of conductive liquid within a mobile wastewater holding tank, the holding tank sensor probe comprising:
    an electrical terminal, wherein:
        an electrical connection to the electrical terminal is configured to pass a time-invariant electrical signal with a constant voltage applied during normal operation while determining presence of conductive liquid within the mobile wastewater holding tank, and
        the electrical terminal is configured for electrical connection to other probes during normal operation that collectively measure a level of the conductive liquid in the mobile wastewater holding tank;
a single probe tip suitable for conducting an electrical signal to the liquid;
an electrical conductor for electrically coupling the electrical terminal and the probe tip, whereby the electrical conductor is configured for installation:
at least partially within the mobile wastewater holding tank during normal operation, and
at least partially outside the wastewater holding tank; and
an electrical insulator between the probe tip and the electrical conductor, wherein:
the electrical insulator has exposed surface,
a path from the probe tip and along the exposed surface away from the probe tip to a most proximate point on a wall of the tank passes a distance in excess of 0.75 inch, and wherein:
a perimeter of the path along the exposed surface perpendicular to current flow has a maximum dimension less than the circumference of a circle having a diameter of a quarter inch, and
the path further comprises a length-to-width ratio that exceeds 2.0 and
the length-to-perimeter ratio is:
the path on the exposed surface in a direction substantially parallel with the electrical conductor, divided by
the perimeter of the path on the exposed surface of a cross section of the path in a direction perpendicular to the length.

12. The holding tank sensor probe for use in determining presence of conductive liquid within the mobile wastewater holding tank as recited in claim 11, wherein the length-to-width ratio exceeds at least one of 2.5, 3.0, 3.5, 4.0, 4.5, 5.0, 5.5, and 6.0.

13. The holding tank sensor probe for use in determining presence of conductive liquid within the mobile wastewater holding tank as recited in claim 11, wherein the distance exceeds one or more of 1.0 inch, 1.25 inches, 1.5 inches, 1.75 inches, 2.0 inches, 2.25 inches, 2.5 inches, 2.75 inches, and 3.0 inches.

14. The holding tank sensor probe for use in determining presence of conductive liquid within the mobile wastewater holding tank as recited in claim 11, further comprising a cap proximate to the electrical conductor, wherein the cap compresses an o-ring to seal the electrical insulator.

15. The holding tank sensor probe for use in determining presence of conductive liquid within the moving wastewater holding tank as recited in claim 11, wherein:
the path includes a change in direction of 120 degrees or more, and
the thickness of the insulator proximate to the change in direction is 5/32 inch or less.

16. The holding tank sensor probe for use in determining presence of conductive liquid within the moving wastewater holding tank as recited in claim 11, wherein:
the path includes a change in direction of 120 degrees or more, and
the radius of the change in direction is 5/64 inch or less.

17. The holding tank sensor probe for use in determining presence of conductive liquid within the mobile wastewater holding tank as recited in claim 11, wherein the electrical insulator, along a radius of a cross-section perpendicular to a line between the probe tip and the electrical terminal, has a first portion and a second portion, which are separated by free space.

18. The holding tank sensor probe for use in determining presence of conductive liquid within the mobile wastewater holding tank as recited in claim 11, further comprising a shield configured to prevent the accumulation of debris and an orientation mark fixed relative to the electrical conductor configured to be visible from outside from the mobile wastewater holding tank.

19. A holding tank sensor probe for use in determining presence of conductive liquid within a mobile wastewater holding tank, the holding tank sensor probe comprising:
an electrical terminal wherein:
an electrical connection to the electrical terminal is configured to pass a time-invariant electrical signal with a constant voltage applied during normal operation while determining presence of conductive liquid within the mobile wastewater holding tank, and
the electrical terminal is configured for electrical connection to other probes during normal operation that collectively measure a level of the conductive liquid in the mobile wastewater holding tank;
a probe tip;
an electrical conductor for electrically coupling the electrical terminal and the probe tip, whereby the electrical conductor is configured for installation through an aperture in the mobile wastewater holding tank during normal operation and wherein only one conductive element passes through the aperture; and
an electrical insulator between the probe tip and the electrical conductor, wherein:
the electrical insulator has a cross section, and
the cross section has a maximum dimension of 5/16 inch or less in at least one part,
a conductive residue path passes from the probe tip and along the exposed surface away from the probe tip to a most proximate point on a wall of the mobile wastewater holding tank,
a perimeter of the conductive residue path along the exposed surface perpendicular to current flow has a maximum dimension less than the circumference of a circle having a diameter of a quarter inch, and
the conductive residue path further comprises a length-to-width ratio that exceeds 2.0, and
the length-to-width ratio is:
a length of a conductive residue path on the exposed surface in a direction substantially parallel with the electrical conductor, divided by
the width of the conductive residue path on the exposed surface in a direction perpendicular to the length.

20. The holding tank sensor probe for use in determining presence of conductive liquid within the mobile wastewater holding tank as recited in claim 19, wherein the length-to-width ratio exceeds one of 0.5, 0.75, 1.0, 1.25, 1.5, 1.75, 2.0, 2.5, 3.0, 3.5, 4.0, 4.5, 5.0, 5.5, and 6.0.

21. The holding tank sensor probe for use in determining presence of conductive liquid within the mobile wastewater holding tank as recited in claim 19, wherein the maximum dimension is at least one of 1/16 inch, 3/32 inch, 1/8 inch, 5/32 inch, 3/16 inch, 7/32 inch, 1/4 inch, 9/32 inch, and 5/16.

22. The holding tank sensor probe for use in determining presence of conductive liquid within the mobile wastewater holding tank as recited in claim 19, wherein the conductive residue path from the probe tip and along the exposed surface away from the probe tip to a most proximate point on a wall of the tank passes a distance that exceeds one of 0.75 inch, 1.0 inch, 1.25 inches, 1.5 inches, 1.75 inches, 2.0 inches, 2.25 inches, 2.5 inches, 2.75 inches, and 3.0 inches.

23. The holding tank sensor probe for use in determining presence of conductive liquid within the mobile wastewater holding tank as recited in claim 19, further comprising a shield that can be positioned to prevent the accumulation of debris on the probe tip and an orientation mark fixed relative to the electrical conductor configured to be visible from outside the mobile wastewater holding tank.

24. The holding tank sensor probe for use in determining presence of conductive liquid within the mobile wastewater holding tank as recited in claim 19, wherein the electrical insulator, along a radius of a cross-section perpendicular to a line between the probe tip and the electrical terminal, has a first portion and a second portion, which are separated by free space.

25. The single-terminal moving wastewater holding tank sensor probe for use in determining presence of conductive liquid within the wastewater holding tank as recited in claim 1, wherein at least two of the electrical terminal, the electrical conductor and the probe tip are separable.

* * * * *